US010638534B2

(12) United States Patent
Chiang et al.

(10) Patent No.: US 10,638,534 B2
(45) **Date of Patent: *Apr. 28, 2020**

(54) CALL SETUP TIMER TRIGGERED AND TERMINATED BY DIFFERENT PROTOCOLS

(71) Applicant: T-Mobile USA, Inc., Bellevue, WA (US)

(72) Inventors: Hsin-Fu Henry Chiang, Bellevue, WA (US); Shujaur Mufti, Snoqualmie, WA (US); William Michael Hooker, Seattle, WA (US); Boris Antsev, Bothell, WA (US); Shelby Seward, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,519

(22) Filed: Jan. 4, 2019

(65) Prior Publication Data

US 2019/0141772 A1 May 9, 2019

Related U.S. Application Data

(63) Continuation of application No. 15/640,150, filed on Jun. 30, 2017, now Pat. No. 10,244,574.

(Continued)

(51) Int. Cl.

*H04W 76/18* (2018.01)
*H04W 4/90* (2018.01)

(Continued)

(52) U.S. Cl.

CPC ......... *H04W 76/18* (2018.02); *H04L 65/1006* (2013.01); *H04L 65/1016* (2013.01);

(Continued)

(58) Field of Classification Search

CPC ............. H04L 65/1006; H04L 65/1016; H04L 65/1069; H04L 65/80; H04L 69/28;

(Continued)

(56) References Cited

U.S. PATENT DOCUMENTS 10,244,574 B2 * 3/2019 Chiang ............. H04W 36/0022
2007/0201448 A1 8/2007 Baird et al.

(Continued)

OTHER PUBLICATIONS

"Practical Performance Analyses of Circuit-Switched Fallback and Voice Over LTE"; Elnashar et al.; IEEE Transactions on Vehicular Technology, vol. 66, No. 2, Feb. 2017 (Year: 2017).*

(Continued)

*Primary Examiner* — Benjamin H Elliott, IV

(74) *Attorney, Agent, or Firm* — Lee & Hayes, P.C.

(57) ABSTRACT

One or more timers can be used by an originating UE during setup of a communication session. The timer(s) can be triggered by an originating UE sending a request or receiving a response that uses a first signaling protocol. The timer(s) can further be terminated by the originating UE sending a request or receiving a response that uses a second signaling protocol different from the first signaling protocol, so long as the request/response using the second signaling protocol occurs before timeout of the timer(s).

20 Claims, 8 Drawing Sheets

Related U.S. Application Data

(60) Provisional application No. 62/469,391, filed on Mar. 9, 2017.

(51) Int. Cl.

*H04L 29/06* (2006.01)
*H04W 36/00* (2009.01)
*H04W 76/10* (2018.01)
*H04W 80/10* (2009.01)
*H04W 84/04* (2009.01)

(52) U.S. Cl.

CPC .......... *H04L 65/1069* (2013.01); *H04L 65/80* (2013.01); *H04L 69/28* (2013.01); *H04W 4/90* (2018.02); *H04W 36/0022* (2013.01); *H04W 76/10* (2018.02); *H04W 80/10* (2013.01); *H04W 84/042* (2013.01)

(58) Field of Classification Search

CPC . H04W 36/0022; H04W 76/10; H04W 76/18; H04W 80/10; H04W 84/042

See application file for complete search history.

(56) References Cited

U.S. PATENT DOCUMENTS

| | | | | |
|---|---|---|---|---|
| 2008/0062985 | A1* | 3/2008 | Agarwal | H04L 47/2416 370/392 |
| 2009/0106439 | A1* | 4/2009 | Twitchell, Jr. | H04L 45/00 709/230 |
| 2012/0309338 | A1 | 12/2012 | Yli-Tuomi et al. | |
| 2013/0100795 | A1 | 4/2013 | Zhao et al. | |
| 2015/0140948 | A1* | 5/2015 | Tiwari | H04L 69/28 455/404.1 |
| 2015/0208450 | A1 | 7/2015 | Mademann et al. | |
| 2015/0257178 | A1 | 9/2015 | Huang-Fu et al. | |
| 2015/0304071 | A1* | 10/2015 | Koskinen | H04L 1/1838 370/331 |
| 2016/0142535 | A1 | 5/2016 | Poremba | |
| 2016/0150574 | A1 | 5/2016 | Edge et al. | |
| 2016/0183156 | A1 | 6/2016 | Chin et al. | |
| 2016/0353460 | A1 | 12/2016 | Balakrishnan et al. | |
| 2017/0134994 | A1* | 5/2017 | Chinthalapudi | H04W 76/18 |
| 2017/0359186 | A1 | 12/2017 | Atarius et al. | |
| 2017/0374635 | A1* | 12/2017 | Islam | H04W 60/00 |
| 2018/0263066 | A1 | 9/2018 | Chiang et al. | |
| 2018/0263068 | A1* | 9/2018 | Chiang | H04W 36/0022 |
| 2019/0141772 | A1* | 5/2019 | Chiang | H04W 36/0022 |

OTHER PUBLICATIONS

"Supporting Voice over LTE: Solutions, ARchitectures, and Protocols"; Casey et al.; 2013 22nd International Conference on Computer Communication and Networks (ICCCN); Jul. 30, 2013 (Year: 2013).*

PCT Invitation to Pay Additional Fees dated May 4, 2018 for PCT Application No. PCT/US18/21796, 2 pages.

The PCT Search Report and Written Opinion dated Jun. 26, 2018, for PCT Application No. PCT/US18/21796, 13 pages.

Non Final Office Action dated Nov. 8, 2019 for U.S. Appl. No. 15/640,187 "Call Setup Timer Triggered by Network Response" Chiang, 16 pages.

* cited by examiner

CALL SETUP TIMER TRIGGERED AND TERMINATED BY DIFFERENT PROTOCOLS

CROSS REFERENCE TO RELATED APPLICATIONS

This U.S. patent application is a continuation of and claims priority to co-pending and commonly assigned U.S. patent application Ser. No. 15/640,150, entitled "CALL SETUP TIMER TRIGGERED AND TERMINATED BY DIFFERENT PROTOCOLS," and filed on Jun. 30, 2017, which claims priority to provisional U.S. patent application Ser. No. 62/469,391, entitled "VoLTE Call Setup Timer Triggers," and filed on Mar. 9, 2017. Application Ser. No. 15/640,150 and Application Ser. No. 62/469,391 are incorporated herein by reference in their entirety.

BACKGROUND

When a user subscribes to a telecomm carrier's telephony services, the subscribing user can utilize a user equipment (UE), such as a mobile handset, to make calls. A carrier that provides access to a Long Term Evolution (LTE) network can provide such telephony services using Voice over LTE (VoLTE). VoLTE is a fairly reliable technology, but the UE may, in some instances, be unsuccessful in establishing a VoLTE call. This can be due to various issues that arise from time-to-time inhibiting establishment of a VoLTE session. For example, a network outage may occur during a particular call attempt, and the UE may not receive a network response that is needed to establish a dedicated evolved packet system (EPS) bearer for setting up a VoLTE call. Such a network outage may be due to a failure at a mobility management entity (MME) that is responsible for sending the response to the UE.

Rather than wait an indefinite period of time for such an issue to resolve itself from the network side, the UE is typically configured to utilize one or more timers during call setup to proactively resolve the issue from the client side. These timers are configured to timeout if something that is expected to occur during call setup does not occur within a set period of time. Accordingly, after a call setup timer is triggered, the UE can wait a set period of time until the timer expires, and thereafter take some remedial action. The action taken by the UE can include, among other possible actions, dropping the call so that the user is not left waiting indefinitely for an answer, or reattempting the call using a different approach (e.g., a different call path) in an effort to establish the call for the user.

Existing call setup timers implemented in today's UEs are problematic because the call setup timers can, in some instances, cause downstream network issues, like network outages, due to the way the timers are designed. A salient example is in the context of emergency calls. When a user dials 911 (in the United States) on his/her UE, the call is routed to an appropriate (e.g., nearest) public safety answering point (PSAP). Local regulations for PSAPs may differ, but most PSAPs are required to take extra steps to avoid a situation where an emergency call goes unanswered. For instance, some PSAPs are required to record every call attempt to the PSAP, some record every call that begins ringing, some require a person to answer the call, and/or, if an Interactive Voice Response (IVR) system is in place, a call can be answered by the IVR system, and some PSAPs call back every call that is not answered by a person or an IVR system. Imagine a scenario where multiple UEs are frequently reattempting calls to a single PSAP, but failing to establish the call on each reattempt due to a network issue. In this scenario, the frequent expiration of call setup timers on the individual UEs are causing the frequent reattempts, and the PSAP may be unable to recover from the issue due to the sheer volume of incoming calls. As a consequence, the problem may "snowball" out of control to a point where the PSAP can no longer handle the high volume of traffic, and calls may not get through to the PSAP. As a result, one or more of these calls may go unanswered and emergency response services may be compromised. In recognizing that the aforementioned problem is, at least partly, caused by poorly-designed call setup timers, there is a need for further improvements to UE call setup procedures utilizing timers.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 1A shows a scenario where the timer is not fired (the meaning of "fired" is described in the Detailed Description, below).

FIG. 2A shows a scenario where the timer is not fired.

DETAILED DESCRIPTION

Figure 1A:
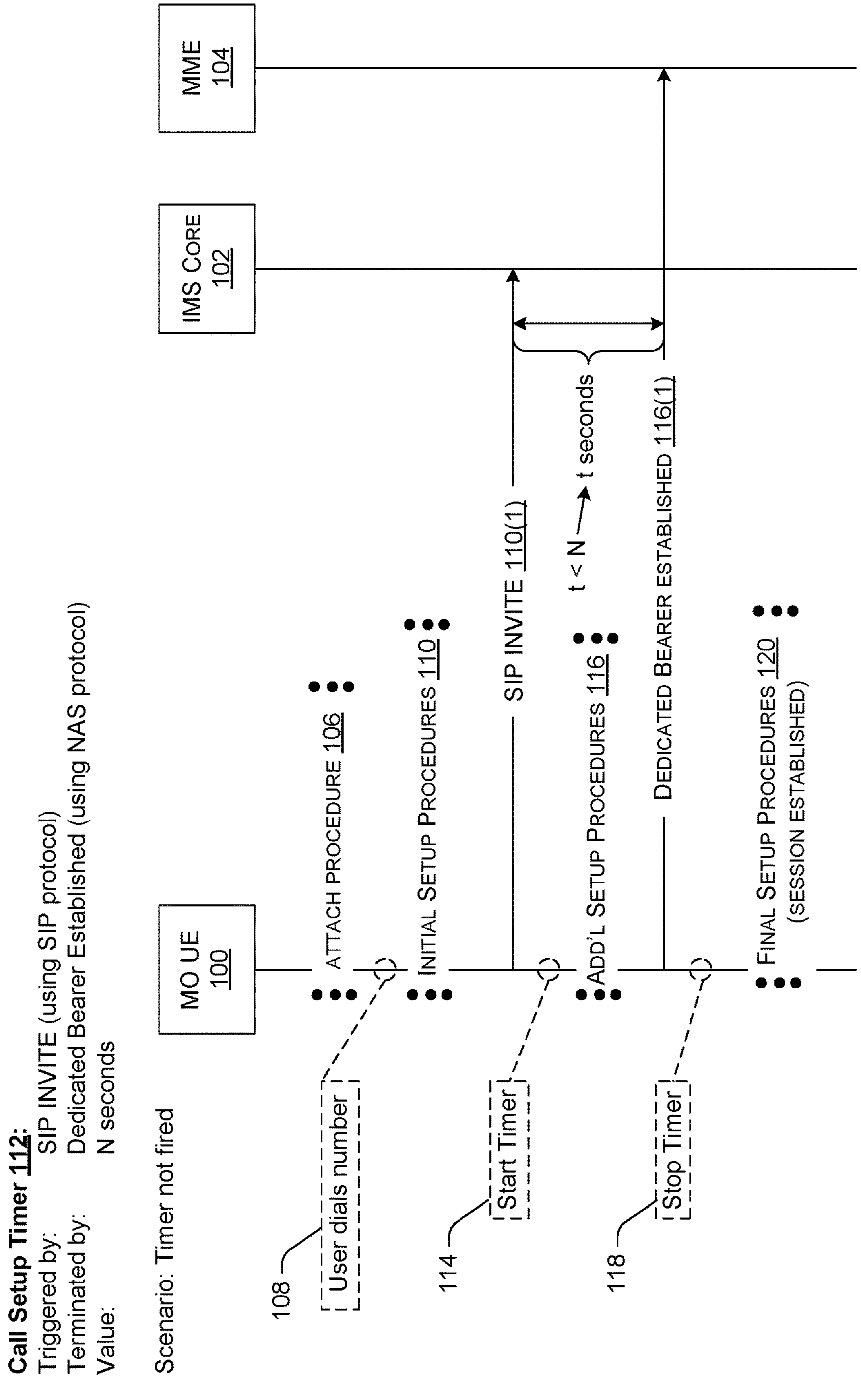
FIG. 1A is a diagram illustrating example signaling between an originating UE and example network nodes during setup of a communication session, and the use of a session setup timer that is triggered and terminated by setup procedures that use different signaling protocols, respectively.

Described herein are techniques and systems for implementing one or more timers during setup of a communication session. This timer(s) is sometimes referred to herein as a "session setup timer," or a "communication session setup timer," and for calls in particular, a "call setup timer." The session setup timer(s) may be triggered and terminated by particular events, as described herein, which are expected to occur during session setup. In some embodiments, a session setup timer is triggered by an originating UE sending a request, or receiving a response, that uses a first signaling protocol, and is terminated by the originating UE sending a request, or receiving a response, that uses a second signaling protocol different from the first signaling protocol. This provides more flexibility as compared to existing call setup timers because existing call setup timers are limited to triggering and termination events that occur within a common signaling protocol.

An example process to be implemented by an originating UE can include receiving user input requesting to establish a communication session, performing a first setup procedure of multiple setup procedures to setup the communication session, the first setup procedure comprising at least of: (i) sending a first request using a first signaling protocol or (ii) receiving a first response using the first signaling protocol, and starting a timer in response to the performing of the first setup procedure, the timer being configured to expire after a period of time. After starting the timer, the originating UE continues the multiple setup procedures, and, during those setup procedures, if the originating UE performs a second setup procedure using a second signaling protocol prior to expiration of the timer, the originating UE stops the timer, finishes the setup procedures, and establishes the communication session over a telecommunications network. Here, the second setup procedure may comprises at least one of: (i) sending a second request using a second signaling protocol or (ii) receiving a second response using the second signaling protocol. If, however, the timer expires prior to the performance of the second setup procedure, the originating UE may halt the multiple setup procedures, and reattempt the setup of the communication session with new setup procedures.

In some embodiments, a timer(s) implemented by an originating UE during setup of a communications session is triggered by a response received from a node of a telecommunications network. This alternative approach also provides more flexibility as compared to existing call setup timers, which are known to be triggered by requests that are sent from the UE to a network node.

An example process implemented by an originating UE can include receiving user input requesting to establish a communication session, performing a first setup procedure of multiple setup procedures to setup the communication session, the first setup procedure comprising receiving a response from a node of a telecommunications network, and starting a timer in response to performance of the first setup procedure, the timer being configured to expire after a period of time. After starting the timer, the originating UE continues the multiple setup procedures, and, during those setup procedures, if a particular setup procedure occurs prior to expiration of the timer, the originating UE stops the timer, finishes the setup, and establishes the communication session over the telecommunications network. If, however, the timer expires prior to the occurrence of the particular setup procedure, the originating UE may halt the multiple setup procedures and reattempt the setup of the communication session with new setup procedures.

Also disclosed herein are systems and devices comprising one or more processors and one or more memories, as well as non-transitory computer-readable media storing computer-executable instructions that, when executed, by one or more processors perform various acts and/or processes disclosed herein.

The techniques and systems described herein for implementing session setup timers at an originating UE provide more flexibility in configuring the UE to take an appropriate action(s) at an appropriate time(s) during setup of a communication session. Specifically, configuring a session setup timer to be triggered and terminated by the particular events described herein allows for optimization of UE procedures performed during setup of a communication session. Optimization of UE procedures during session setup may alleviate (e.g., reduce the occurrence of) downstream network issues, such as network outages. The end result is an improved session experience from the perspective of subscribing users participating in a communication session.

FIG. 1A is a diagram illustrating example signaling between a originating UE 100 (designated as "MO UE" 100 in FIG. 1A, "MO" meaning "mobile originated" or "mobile originating") and example network nodes, including, an Internet Protocol Multimedia Subsystem (IMS) core 102, and a mobility management entity (MIME) 104. It is to be appreciated that the "nodes" depicted in FIG. 1A may in fact represent multiple nodes. For example, the IMS core 102 may itself comprise multiple call session control function (CSCF) nodes, application servers, a home subscriber server (HSS), and the like, as would be recognized by a person having ordinary skill in the art.

In accordance with various embodiments described herein, the terry "user equipment (UE)," "wireless communication device," "wireless device," "communication device," "mobile device," and "client device," may be used interchangeably herein to describe any UE the originating UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology. The originating UE 100 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like.

In general, a user can utilize the originating UE 100 to communicate with other computing devices of a telecommunications network via the IMS core 102. The IMS core is sometimes referred to herein as the "IMS core network 102," the "IMS network 102," the "Core Network (CN) 102," or the "IM CN Subsystem 102". The IMS core 102 is an architectural framework defined by the $3^{rd}$ generation partnership project (3GPP) for delivering Internet Protocol (IP) multimedia to a UE, such as the originating UE 100. The IMS core 102 can be maintained and/or operated by one or more service providers, such as one or more wireless carriers (or "operators"), that provide IMS-based services to users (sometimes called "subscribers") who are associated with UEs, such as the originating UE 100. For example, a service provider may offer multimedia telephony services that allow a subscribed user to call or message other users via the IMS core 102 using his/her UE. A user can also utilize an associated UE to receive, provide, or otherwise interact with various different IMS-based services by accessing computing devices of the IMS core 102. In this manner, an operator of the IMS core 102 may offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (i.e., a voice-based communication session, such as a VoLTE call).

The originating UE 100 is configured to utilize various radio access networks (RANs) and/or radio access technologies (RATs) in order to access the IMS core 102. UEs that are fourth generation (4G) LTE-compliant are configured to communicate within heterogeneous cellular networks by employing radios that can communicate over LTE systems (or "LTE networks") as well as over legacy systems (or "legacy networks"). Legacy networks, such as third generation (3G), and second generation (2G) networks, may employ circuit-switching for voice communications, while LTE networks employ packet-switching for both data and voice communications in an all-IP data transport technology. In general, 4G LTE-compliant and 5G New Radio (NR)-compliant UEs are configured to prefer attachment to corresponding networks, which offer relatively high data-rate throughput as compared to available legacy networks. In most UEs, a choice of which protocol to employ depends primarily on what networks are available to the UE at the UE's present geographic location. Furthermore, in instances where the preferred network (e.g., 4G 5G, etc.) is unavailable or unusable for any reason, legacy networks, if available, may be used as a fallback protocol, such as by using a circuit-switch fallback (CSFB) mechanism. The originating UE 100 of FIG. 1A can comprise a UE with such capabilities to allow for communication over any type of telecommunications network.

FIG. 1A illustrates that the originating UE 100 may perform an attach procedure 106 in order to attach to a telecommunications network. In instances where a legacy network is available to the originating UE 100, the originating UE 100 can utilize a "combined attach" procedure where the originating UE 100 sends an attachment request by performing registration for services via both a legacy (i.e., circuit-switch (non-LTE)) network and a LTE (i.e., packet-switched) network. If successful in the combined attached registration procedure, the result of the attachment request is one where the originating UE 100 is "combined attached," and the originating UE 100 can thereafter implement fallback procedures to reattempt establishment of a communication session via a legacy network in the event that an LTE-based communication session (e.g., a VoLTE call) fails, or cannot be provided with sufficient Quality of Service (QoS) (i.e., below a QoS threshold), on the LTE network. If unsuccessful in the combined attach request, or if there is only a single network available (e.g., the UE is at a geographic location within an LTE-only coverage area, or within a legacy network-only coverage area, etc.), a different result of the attachment request may be one where the originating UE 100 is not combined attached, and is therefore attached to a single network. In either case, an attached UE will have established a radio link in order to transmit data to, and receive data from, nodes ire the telecommunications network, such as the IMS core 102.

Before attempting to setup and establish a communication session, the originating UE 100 may perform the attach procedure 106, which may include, among other sub-procedures, requesting registration for one or more IMS-based services provided via the IMS core 102. Registration of the originating UE 100 can involve identifying a proxy CSCF (P-CSCF) node of the IMS core 102, and sending a registration request via a RAN (e.g., an LTE RAN) to an address of the P-CSCF node.

As used herein, a "request" is a message that is sent from a UE, such as the originating UE 100, to a network node (e.g., a node of the IMS core 102, the MME 104, etc.). Meanwhile, a "response" is a message that is sent from a network node to a UE, such as the originating UE 100. This construct may be used when discussing communications that use any particular signaling protocol. For example, Session Initiation Protocol (SIP) may be used by the originating UE 100 for transmitting messages to/from the IMS core 102. Accordingly, a "SIP request" is a message that is sent from a UE, such as the originating UE 100, to the IMS core 102 using SIP protocol, and a "SIP response" is a message that is sent from the IMS core 102 to a UE, such as the originating UE 100, using SIP protocol. SIP is a signaling protocol that can be used to establish, modify, and terminate multimedia sessions (e.g., a multimedia telephony call) over packet networks, and to authenticate access to IMS-based services. Accordingly, during the attach procedure 106, the originating UE 100 may send a registration request using the SIP REGISTER method as part of the initial procedures for establishing a multimedia communication session. The IMS core 102 allows for peer-to-peer communications, as well as client-to-server communications over an IP-based network. Accordingly, the IMS core 102 can represent any type of SIP-based network that is configured to handle/process SIP signaling packets or messages.

In FIG. 1A, after the originating UE 100 has performed the attached procedure 106 and is attached to a telecommunications network, a user of the originating UE 100 can initiate a communication session, such as a call. To accomplish this, the user can dial a number, as shown by reference numeral 108 in FIG. 1A. This user action causes the originating UE 100 to perform initial setup procedures 110 in an attempt to setup and establish a communication session, such as a VoLTE call when the originating UE 100 is attached to an LTE network. It is to be appreciated that the user can dial a number in any suitable fashion, such as by selecting an existing contact (e.g., a stored phone number), by dialing a phone number on a keypad, by speaking an utterance (e.g., "Call Mom") that is detected by a microphone of the originating UE 100 and parsed by voice recognition software, and so on. In the United States, the user can, for instance, dial a 10 digit number to make a normal call to another user. 3 digit short codes are also available for a user to access various services, such as "911" for emergency services.

In the case of a 3 digit emergency short code ("911" in the United States), the initial setup procedures 110 may include one or more setup procedures that are particular to the emergency type of communication session. For example, the originating UE 100 may send, as part of the initial setup procedures 110 for a 911 call, an emergency packet data network (E-PDN) connection request to the MME 104. Such a request may be sent from the UE 100 using Non-Access Stratum (NAS) protocol. NAS is actually a set of protocols in the EPS, and is used to convey non-radio signaling between a UE, such as the originating UE 100, and the MME 104 for LTE/E-UTRAN access. Continuing with the emergency call example, the initial setup procedures 110 may further include a response (e.g., an E-PDN connected response) from the MME 104 to the originating UE 100 indicating that the UE 100 is connected to the E-PDN. The originating UE 100 may also send an emergency registration (E-REG) request as part of the initial setup procedures 110, and may receive a response to the E-REG request indicating a successful emergency registration.

At least one of the initial setup procedures 110 may include a communication session request 110(1) sent from the originating UE 100 to the IMS core 102. As shown in FIG. 1A, the communication session request 110(1) can comprise a SIP request using the SIP INVITE method. This request 110(1) is a request for a communication session be established with a terminating UE. In the case of an emergency call, the terminating UE may comprise a UE at the nearest PSAP. FIG. 1A, however, is not limited to emergency communication sessions, as it can also be described with reference to a "normal" (i.e., non-emergency) communication session. In a "normal" communication session scenario of FIG. 1A, any emergency-related setup procedures described herein may be omitted. Nevertheless, the initial setup procedures 110 for a normal (non-emergency) communication session may include sending the communication session request 110(1) (e.g., the SIP INVITE) from the originating UE 100 to the IMS core 102, just as with the emergency communication session.

It is to be appreciated that the initial setup procedures 110 can include various actions and message transmissions by and between the originating UE 100 and various network nodes in addition to the example actions and message transmission described herein, and that some or all of the example setup procedures 110 may be performed during session setup, depending on the implementation. In general, any suitable setup procedures known to a person having ordinary still in the art can be included in the initial setup procedures 110 of FIG. 1A, which are performed with the aim of establishing a communication session for the originating UE 100 over a telecommunications network.

FIG. 1A further illustrates that the originating UE 100 is configured to implement a call setup timer 112 with particular properties/characteristics. Although "call" setup timer 112 is used in many of the examples described herein, it is to be appreciated that the timer 112 can be similarly implemented for other types of communication sessions that involve setup procedures similar to those described herein for calls. Although a single timer 112 is shown in FIG. 1A, it is to be appreciated that the originating UE 100 may implement multiple call setup timers, each with defined properties/characteristics including, without limitation, a trigger event that starts the timer, a termination event that stops the timer, a timer value that defines a period of time after which the timer expires, and/or a "fire" action. These timer properties/characteristics will be described in more detail below.

The call setup timer 112 of FIG. 1A is an example timer that is triggered when the originating UE 100 sends a SIP INVITE as a setup procedure 110(1) of one or more initial setup procedures 110. As the name implies, a SIP INVITE is a SIP request that uses SIP as the signaling protocol. Accordingly, when the originating UE 100 sends the communication session request 110(1) in the form of the SIP INVITE, the call setup timer 112 is started at 114. This event (i.e., the sending of the communication session request 110(1)) is an example of what is often referred to herein as a "trigger event." This is because the occurrence of the particular event causes the timer 112 to start (or causes triggering of the timer 112). Said another way, the timer 112 is started if a particular criterion is satisfied. In the example of FIG. 1A, the criterion for triggering the timer 112 is satisfied when the originating UE 100 sends a communication session request 110(1) in the form of a SIP INVITE.

A timer value defines a period of time (e.g., N seconds) after which the timer 112 will expire, as measured from starting the timer 112 at 114. The timer value may be specified in any suitable unit of time (e.g., seconds, milliseconds, minutes, etc.).

The example call setup timer 112 of FIG. 1A is terminated when a dedicated bearer is established during setup of the communication session. Accordingly, after the originating UE 100 triggers the timer 112 by sending the communication session request 110(1) in the form of the SIP INVITE, the UE 100 performs additional setup procedures 116. One of these additional setup procedures 116 includes a request 116(1) from the originating UE 100 to the MME 104 indicating that the dedicated EPS bearer has been established. Because this request 116(1) is sent to the MME 104, it utilizes NAS protocol as the signaling protocol. This event (i.e., the sending of the request 116(1) indicating that the dedicated bearer has been established) is an example of what is often referred to herein as a "termination event." This is because the occurrence of the event causes the timer 112 to stop at 118 (or causes termination of the timer 112). The assumption here is that the termination event occurs before the timer 112 has expired (i.e., before N seconds since starting the timer at 114). Said another way, the timer 112 is stopped at 118 if a particular criterion (or criteria) is satisfied. In this case, the criteria for stopping the timer 112 are satisfied when the originating UE 100 sends a request 116(1) indicating that the dedicated EPS bearer has been established, and when this termination event occurs before the timer 112 expires. To this end, FIG. 1A depicts a scenario where the termination event (i.e., the sending of the request 116(1) indicating that the dedicated bearer has been established) occurs t seconds since the timer 112 was started at 114, where t is less than N seconds, N being the value of the timer 112 that defines the expiration period. In the scenario of FIG. 1A, the timer 112 is stopped at 118, and, after stopping the timer 112 at 118, the originating UE 100 performs one or more final setup procedures 120 until the communication session is ultimately established. The exception to this is that another call setup timer may be triggered during the session setup, and may expire (or "fire") prior to session establishment. Examples of "firing" scenarios are described in more detail below.

Like the initial setup procedures 110, the additional setup procedures 116 (that occur after the trigger event), and the final setup procedures 120 (that occur after the termination event) can include various actions and message transmissions by and between the originating UE 100 and various network nodes, some of which are described below. It is to be appreciated that the setup procedures enumerated herein are merely examples, and that some or all of these example setup procedures may be performed, along with additional setup procedures known to a person having ordinary skill in the art, during session setup, depending on the implementation. Furthermore, setup procedures can vary by the type of communication session, such as an emergency communication session verses a normal (non-emergency) communication session. Setup procedures may also vary by attachment result, such as combined attached verses not combined attached.

Example setup procedures that may be included in the setup procedures 110, 116, and/or 120 are now described by way of example. For example, an individual setup procedure of the setup procedures 110, 116, and 120 can include, without limitation, the originating UE 100 sending/receiving any SIP request/response to/from the IMS core 102, such as sending a SIP INVITE request, receiving a 100 Trying response (indicating that a communication session request, such as the request 110(1), has been received at a terminating UE), receiving a 180 Ringing response (indicating that a called party of the terminating UE is being alerted), receiving a 181 Call Being Forwarded response, receiving a 182 Queued response, receiving a 183 Session In Progress response, receiving a SIP response that includes session description protocol (SDP) information (e.g., an SDP answer), receiving a SIP response that includes "early media" (e.g., user data), and/or receiving a final response (most likely as part of the final setup procedures 120) to resolve the setup of the communication session. Such a final SIP response can be in the form of a 2xx—successful (e.g., a 200 (OK) response indicating successful connection), 3xx—redirection, 4xx—client failure, 5xx—server failure, or 6xx—global failure, and so on.

Further examples of the setup procedures 110, 116, and 120 of FIG. 1A include, without limitation, the originating UE 100 sending/receiving any NAS-based request/response to/from the MME 104, such as sending/receiving a radio resource control (RRC) connection request/response to/from the MME 104, sending/receiving a RRC connection reconfiguration complete request/response to/from the MME 104, sending/receiving a request/response to/from the MME 104 indicating that a dedicated EPS bearer has been established, and so on. Further examples of the setup procedures 110, 116, and 120 can include, without limitation, the originating UE 100 sending/receiving any type of UPDATE request/response, sending/receiving any type of "ACK" request/response (e.g., a PRACK message), and so on, to/from any suitable network node.

Setup procedures for a given communication session may vary by implementation, session type (e.g., phone call verses video conference, emergency verses non-emergency call, etc.), attachment result (e.g., combined attached verses not combined attached), and/or other factors. Accordingly, detailed and exhaustive examples of setup procedures and the order in which they are performed in order to setup a communication session are not described herein, as the various possible setup procedures are generally known to a person having ordinary skill in the art. As such, any given session setup may include some or all of the example setup procedures described herein, performed in a suitable order to establish a communication session, such as a VoLTE call. It is to be appreciated that a communication session is not successfully established unless and until the originating UE 100 receives a final SIP response in the form of a 2xx response.

Figure 1B:
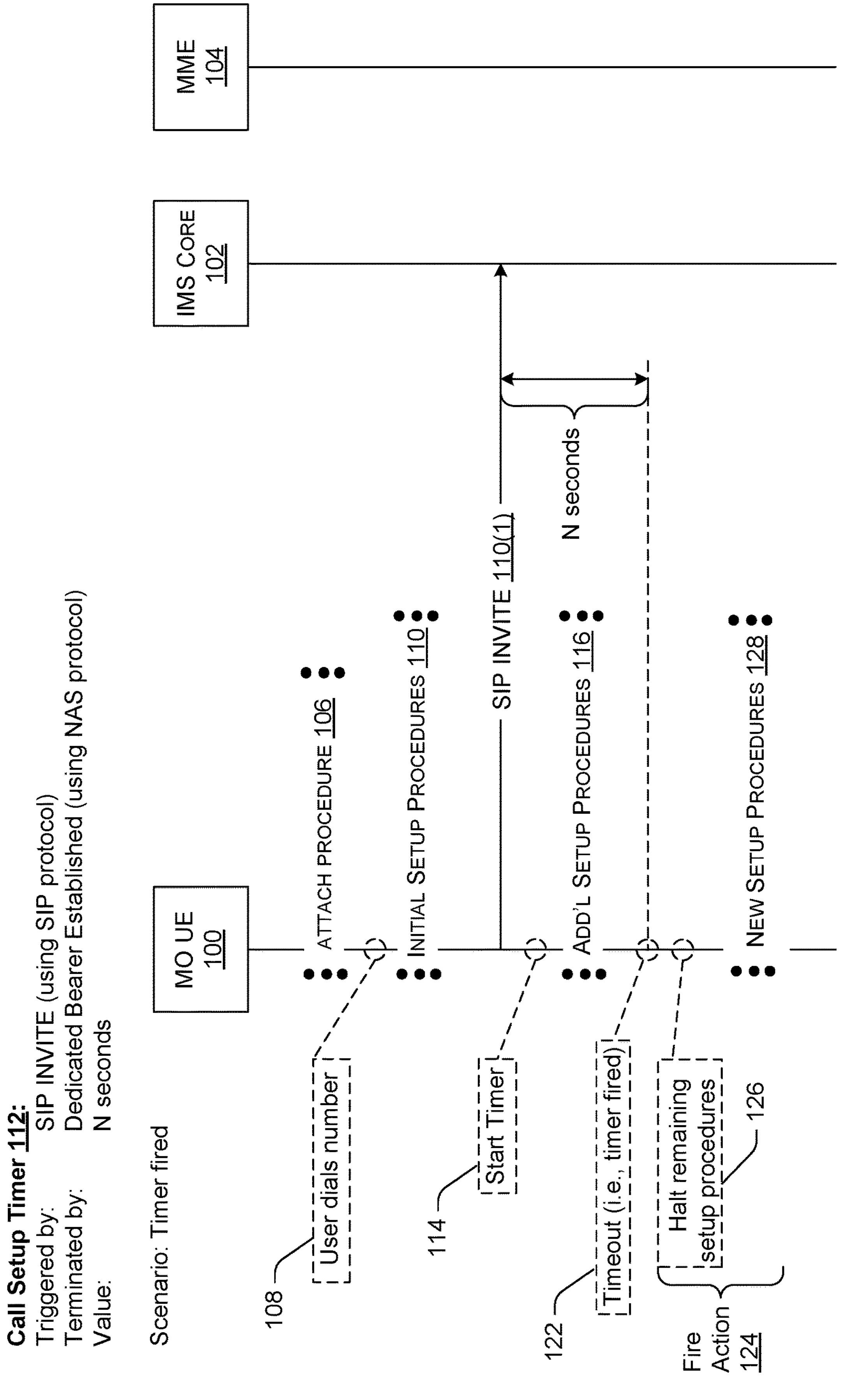
FIG. 1B is a diagram illustrating example signaling using the session setup timer of FIG. 1A, but in a scenario where the timer is fired.

Turning to FIG. 1B, there is illustrated an example implementation of the timer 112 of FIG. 1A, but in a scenario where the timer 112 is fired (i.e., the timer 112 expires during session setup). In the scenario of FIG. 1B, the timer 112 is started at 114 in response to the occurrence of the trigger event associated with the timer 112. The description of FIG. 1A up to the point of starting the timer 112 at 114 applies to FIG. 1B, as the timer 112 is still triggered by the originating UE 100 sending the communication session request 110(1) in the form of the SIP INVITE to the IMS core 102. In FIG. 1B, the additional setup procedures 116 are performed, except that the termination event for stopping the timer 112 is not performed within N seconds from starting the timer 112 at 114, and the timer 112 expires at 122. Expiration of the timer 112 can be referred to herein as a "timeout," or the timer 112 "firing." When a timer "fires," it means that the period of time defined by the timer value (e.g., N seconds) has lapsed since starting the timer 112, and without the designated termination event occurring before timeout. In other words, if the timer 112 "fires," it means that the timer 112 was not stopped by the designated termination event within the designated period of time defined by the timer value. In the example of FIG. 1B, the dedicated EPS bearer was not established within N seconds from the sending of the communication session request 110(1) in the form of the SIP INVITE, causing the timeout at 122.

In response to the timer 112 firing/expiring/timing out at 122, the originating UE 100 may perform a designated "fire" action 124. The fire action 124 taken by the originating UE 100 can vary, depending on the implementation. In some embodiments, the fire action 124 includes the originating UE 100 halting, at 126, any remaining setup procedures that were to be carried out by the originating UE 100 in an attempt to setup and establish the communication session, as well as reattempting the setup of the communication session with new setup procedures 128. In this manner, the fire action 124 can comprise multiple actions (e.g., halting and reattempting, as shown in FIG. 1B). Halting the remaining setup procedures at 126 may include the originating UE 100 sending a SIP message using the SIP CANCEL method in order to terminate the session setup associated with the first attempt. The new setup procedures 128 may differ from the setup procedures leading up to, and including, the halted setup procedures, or the new setup procedures 128 may be the same as those performed in the previous attempt. In the latter case, the UE merely waits a period of time and reattempts setup of the communication session using the same setup procedures. In the former case, the UE 100 can reattempt the setup of the communication session via a different call path. For example, the UE 100 can attempt session setup on a legacy telecommunications network (e.g., a circuit-switched (CS) network) instead of an LTE network on which the originating UE 100 previously attempted to establish the communication session. As another example, the UE 100 can reattempt the setup of the communication session using a different type of RAN (or a different type of RAT), such as using a WiFi RAN (e.g., a WiFi Access Point (AP)) for VoWiFi, where the previous attempt used a 3GPP RAN, such as an eNodeB. As yet another example, the UE 100 can reattempt the setup of the communication session using a different address of a P-CSCF node in the IMS core 102, as compared to an address of the previous P-CSCF node to which the originating UE 100 sent requests during the previous attempt. In some embodiments, the fire action 124 may omit performing any new setup procedures 128, such as when the fire action 124 is to simply drop the call so that the user is not left waiting an indefinite period of time for a network issue to resolve itself.

The example call setup timer 112 depicted in FIGS. 1A and 1B is an example of a timer 112 that is triggered by a setup procedure that uses a first signaling protocol (e.g., SIP), and that is terminated by a setup procedure that uses a second signaling protocol (e.g., NAS protocol). Although SIP and NAS protocols are used in the example of FIGS. 1A and 1B, it is to be appreciated that other signaling protocols can be used to implement the techniques described herein.

Similarly, trigger and termination events are not limited to signaling between the IMS core 102 and the MME 104, and other signaling between different network nodes can trigger and/or terminate the timer 112, using any pair of different signaling protocols. Accordingly, the session setup timer 112 described herein can be implemented in a more flexible manner as compared to existing call setup timers that are constrained to trigger and termination events within a common protocol. As noted elsewhere herein, this, in turn, alleviates (e.g., reduces the occurrences of) downstream network issues, such a network outages, resulting in improved communication session experiences.

Figure 2A:
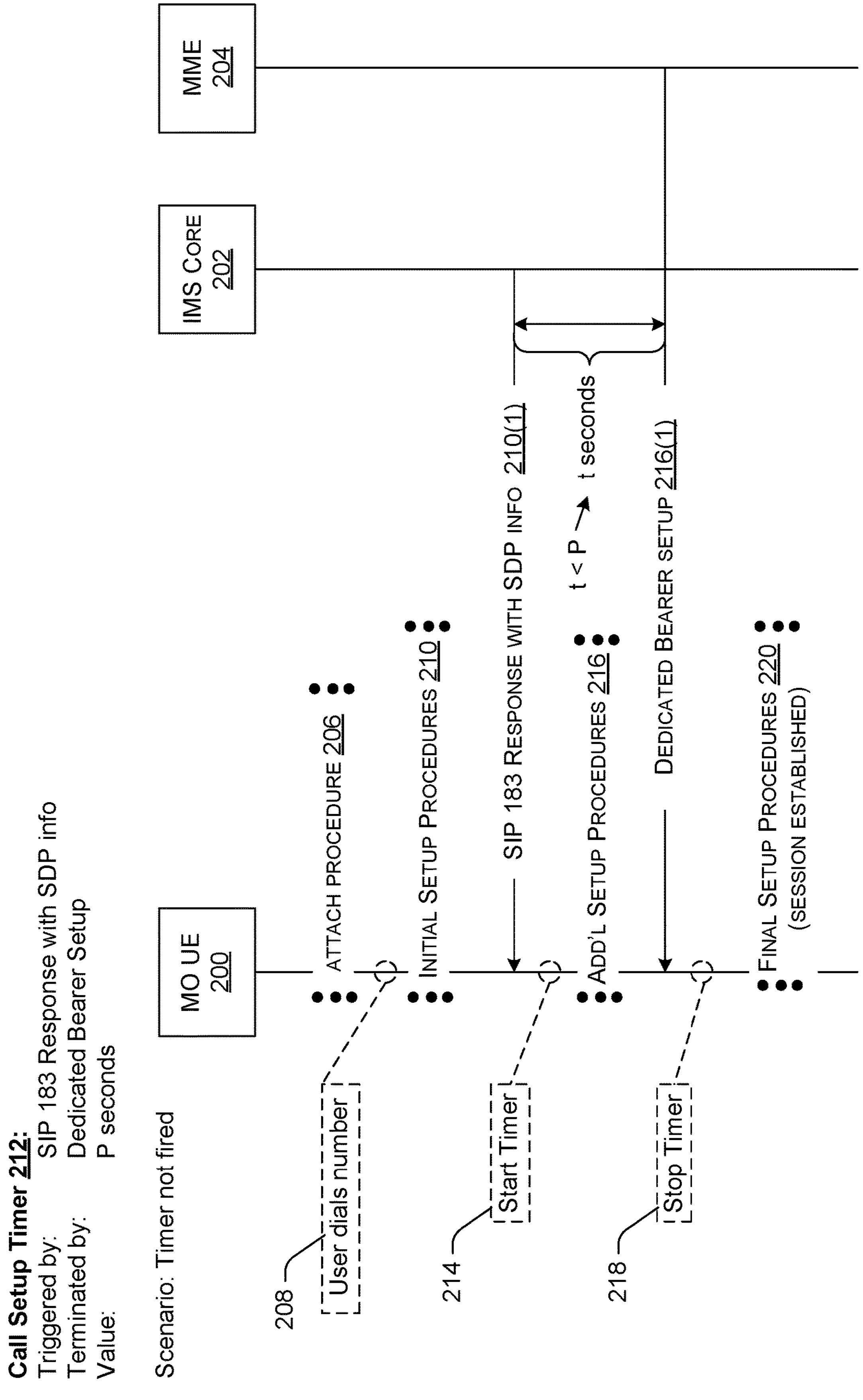
FIG. 2A is a diagram illustrating example signaling between an originating UE and example network nodes during setup of a communication session, and the use of a session setup timer that is triggered by a response from a node of a telecommunications network.

FIG. 2A is a diagram illustrating example signaling between an originating UE 200 and example network nodes, including, an IMS core 202, and a MME 204. FIG. 2A illustrates an example call setup timer 212 that may be implemented by the originating UE 200 according to another embodiment. In the example of FIG. 2A, the call setup timer 212 is triggered by a particular communication session setup procedure that involves the originating UE 200 receiving a response from a node of a telecommunications network, such as a node in the IMS core 202. In particular, the example trigger event for starting the timer 212 in FIG. 2A comprises the originating UE 200 receiving a SIP 183 Session in Progress response 210(1) that includes SDP information. Notably, the example timer 212 would not be triggered by a SIP 183 response that does not include the SDP information. Thus, in the example of FIG. 2A, the criteria for triggering the timer 212 is satisfied when a SIP 183 response is received, and when the SIP 183 response includes SDP information. Session Description Protocol (SDP) is a format for describing streaming media initialization parameters. SDP does not deliver media itself, but is used between end points for negotiation of media type, format, and associated properties thereof.

The example of FIG. 2A also shows that the timer 212 is terminated when the originating UE 200 receives a particular response 216(1). In this case, the response 216(1) that stops the timer 212 is a response 216(1) from the MME 204 that is requesting setup of the dedicated EPS bearer. The response 216(1) may be in the form of a RRC connection response from the MME 204, and may initiate setup of the dedicated EPS bearer. Establishment of the dedicated EPS bearer may occur at a later point in time, after the response 216(1), such as at a step included in the final setup procedures 220 shown in FIG. 2A.

Thus, the timer 212 of FIG. 2A may operate similarly to the timer 112 of FIG. 1A, albeit with different trigger and termination events (or different criteria) for starting and stopping the timer 212, respectively. In addition, the timer value of P seconds may represent any suitable timer value, and the timer value of P seconds may correspond to a different period of time than the timer value of N seconds for the timer 112 of FIGS. 1A and 1B. Alternatively, the timer value of P seconds may be equivalent to the timer value of N seconds. Furthermore, it is to be appreciated that FIG. 2A depicts a scenario where the timer 212 is not fired, meaning that the termination event (i.e., the response 216(1) from the MME 204 for requesting setup of the dedicated bearer) occurs within t seconds from the start of the timer at 214, where t is less than P seconds (the timer value for the timer 212).

Figure 2B:
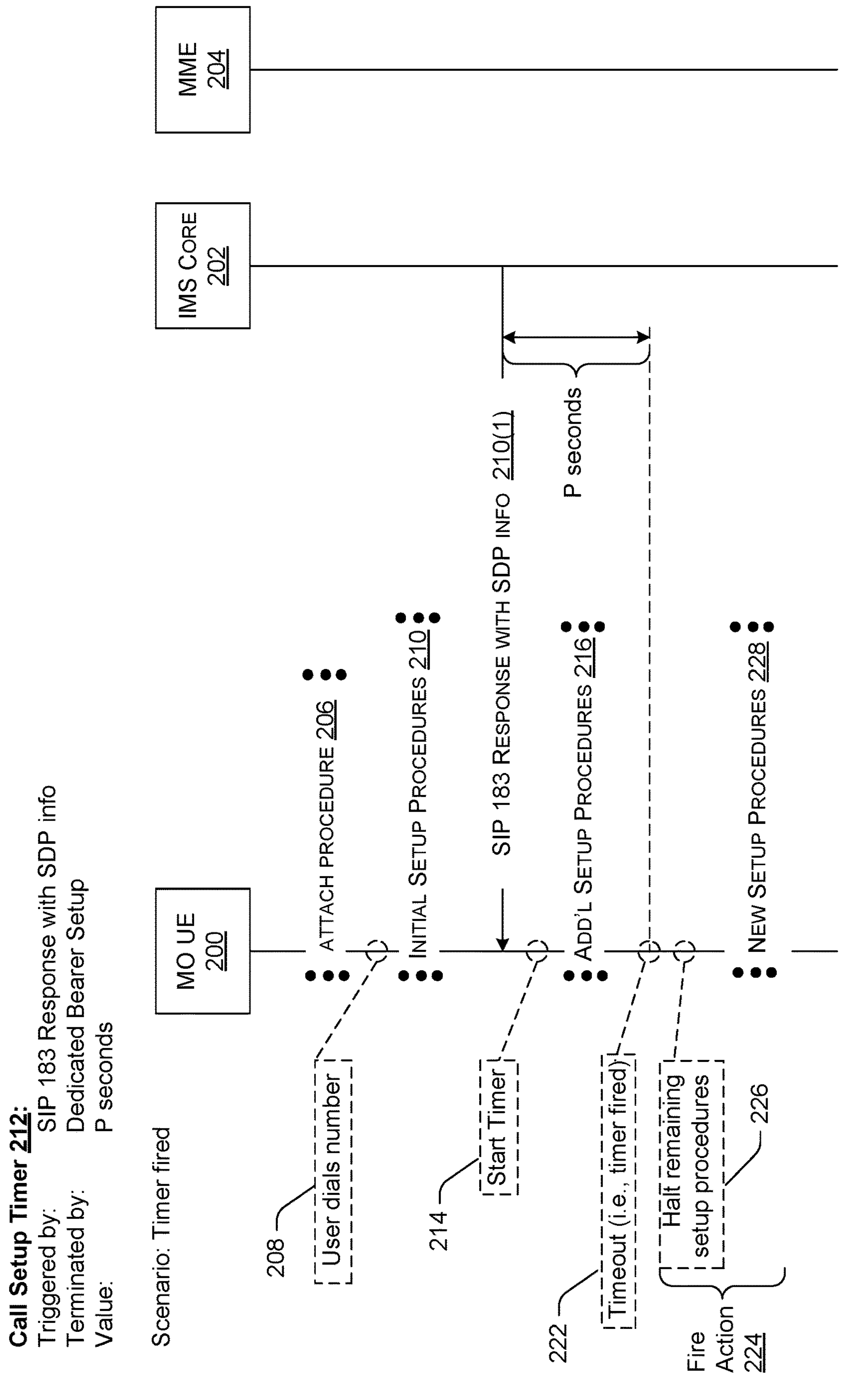
FIG. 2B is a diagram illustrating example signaling using the session setup timer of FIG. 2A, but in a scenario where the timer is fired

Turning to FIG. 2B, there is illustrated an implementation of the timer 212 in a scenario where the timer 212 is fired, meaning that the designated termination event does not occur within P seconds from the start of the timer at 214. In the scenario of FIG. 2B, the timer 212 is started at 214 in response to the occurrence of the trigger event associated with the timer 212, which, in this case, is the receipt, at the originating UE 200, of the SIP 183 response 210(1) that includes SDP information. After the timer 212 is started, the additional setup procedures 216 are performed by the originating UE 200. In the scenario of FIG. 2B, however, the timer expires at 222 after P seconds has lapsed since starting the timer 212 at 214. This is because the termination event (described in FIG. 2A) did not occur within P seconds from the start of the timer 212 at 214. More specifically, FIG. 2B illustrates a scenario where the setup of the dedicated EPS bearer was not requested in a response from the MME 204 within P seconds from the receipt of the SIP 183 response 210(1) that included the SDP information.

In response to the timer 212 firing/expiring at 222 (the meaning of "firing" and "expiring" is explained elsewhere in this disclosure), the originating UE 200 may perform a designated "fire" action 224, which can be any suitable fire action, as described herein, including halting, at 226, any remaining setup procedures that were to be carried out by the originating UE 200 in an attempt to setup and establish the communication session on a previous attempt, as well as reattempting the setup of the communication session with new setup procedures 228.

The example timer 212 depicted in FIGS. 2A and 2B is an example of a session setup timer 212 that is triggered by a setup procedure that involves receiving, by the originating UE 200, a response from a node of the telecommunications network (in this case, a node in the IMS core 202, which, for example, may comprise a P-CSCF node). Furthermore, as shown by FIG. 2A, the timer 212 is also an example of a session setup timer 212 that is triggered by a setup procedure that uses a first signaling protocol (e.g., SIP), and is terminated by a setup procedure that uses a second signaling protocol (e.g., NAS protocol). For one or more of the reasons described herein, the session setup timer 212, like the timer 112 of FIGS. 1A and 1B, can be implemented in a more flexible manner as compared to existing call setup timers, which, in turn, alleviates downstream network issues, such as network outages.

Table 1, below, shows examples of different session setup timers that can be implemented by an originating UE 100/200 according to the techniques and systems described herein. Timer "E" represents an example of the timer 112 discussed with reference to FIGS. 1A and 1B. The example call setup timers listed in Table 1 are examples of different implementation techniques, and are not to be considered as an exhaustive list of timers that can be implemented according to the techniques and systems described herein.

TABLE 1

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| A | USER INPUT FOR 911 CALL RECEIVED | SIP INVITE SENT | NOT APPLICABLE (NA) TO NORMAL CALL | TIMER VALUE: 15S<br><br>FIRE ACTION: CSFB. IF NO UNDERLINE CS NETWORK, LTE-ONLY DIFF RAT REATTEMPT PROCEDURE.<br><br>AFTER CALL ENDED, THE NEXT CALL STARTS WITH A NEW E-PDN CONNECTION | NA TO NORMAL CALL | TIMER VALUE: 15S<br><br>FIRE ACTION: LTE-ONLY DIFF RAT REATTEMPT PROCEDURES IF NO UNDERLINE CS NETWORK, SIMLESS OR LIMITED SERVICE MODE.<br><br>AFTER CALL ENDED, THE NEXT CALL STARTS WITH A NEW E-PDN CONNECTION. |
| B | E-PDN REQUEST SENT | SIP INVITE SENT | NA TO NORMAL CALL | TIMER VALUE: 15S<br><br>FIRE ACTION: CSFB | NA TO NORMAL CALL | TIMER VALUE: 15S<br><br>FIRE ACTION: REATTEMPT DIFFERENT RAT |
| C | E-REG REQUEST SENT | E-REG SUCCESS RESPONSE RECEIVED | NA TO NORMAL CALL | TIMER VALUE: 5S<br><br>FIRE ACTION: ABORT E-REG; IF P-CSCF POOL HAS MORE THAN 1 P-CSCF ADDR, CONTINUE WITH ANONYMOUS INVITE ON ANOTHER P-CSCF IN THE P-CSCF LIST; OTHERWISE CONTINUE WITH ANONYMOUS INVITE ON THE SAME P-CSCF. | NA TO NORMAL CALL | TIMER VALUE: 5S<br><br>FIRE ACTION: ABORT E-REG; IF P-CSCF POOL HAS MORE THAN 1 P-CSCF ADDR, CONTINUE WITH ANONYMOUS INVITE ON ANOTHER P-CSCF IN THE P-CSCF LIST; OTHERWISE CONTINUE WITH ANONYMOUS INVITE ON THE SAME P-CSCF. |
| D | 183 RESPONSE RECEIVED WITH SDP ANSWER (W/ SDP INFO) | DEDICATED BEARER ESTABLISHED (REQUEST OR RESPONSE) | TIMER VALUE: 8S<br><br>FIRE ACTION: CSFB. AFTER CS CALL ENDED, INIT REG USING DIFFERENT P-CSCF | TIMER VALUE: 5S<br><br>FIRE ACTION:<br>1) IF P-CSCF POOL HAS MORE THAN 1 P-CSCF ADDR, NO ACTION DURING THE CALL, WHEN CALL ENDS, REMOVE THE CURRENT P-CSCF ADDR FROM THE AVAILABLE P-CSCF LIST.<br>2) IF P-CSCF POOL HAS ONLY THE CURRENT P-CSCF ADDRESS, CSFB PROCEDURES. IF NO UNDERLINE CS NETWORK, LTE-ONLY DIFF RAT REATTEMPT PROCEDURES. AFTER CALL ENDS, THE NEXT CALL STARTS WITH A NEW E-PDN CONNECTION. | TIMER VALUE: 8S<br><br>FIRE ACTION: NO ACTION DURING THE CALL, AFTER CALL ENDED, INIT REG USING DIFFERENT P-CSCF | TIMER VALUE: 5S<br><br>FIRE ACTION:<br>1) IF P-CSCF POOL HAS MORE THAN 1 P-CSCF ADDR, NO ACTION DURING THE CALL, WHEN CALL ENDS, REMOVE THE CURRENT P-CSCF ADDR FROM THE AVAILABLE P-CSCF LIST.<br>2) IF P-CSCF POOL HAS ONLY THE CURRENT P-CSCF ADDRESS, LTE-ONLY DIFF RAT REATTEMPT PROCEDURES. AFTER CALL ENDS, THE NEXT CALL STARTS WITH A NEW E-PDN CONNECTION. |
| E | SIP INVITE SENT | DEDICATED BEARER ESTABLISHED (REQUEST OR RESPONSE) | TIMER VALUE: 25S<br><br>FIRE ACTION: CSFB, AFTER CS CALL ENDED, INIT REG USING DIFFERENT P-CSCF | HOME PUBLIC LAND MOBILE NETWORK (H-PLMN) TIMER VALUE: 15S<br><br>VISITOR PLMN (V-PLMN) TIMER VALUE: 25S<br><br>FIRE ACTION: USE DEFAULT BEARER IF (180 IS RECEIVED) OR (BOTH 183 AND EARLY MEDIA IS RECEIVED) THEN {<br><br>USE DEFAULT EPS BEARER TO CONTINUE THE CALL, WHEN THE CALL IS ENDED, DISCONNECT E-PDN) | TIMER VALUE: 25S<br><br>FIRE ACTION: NO ACTION DURING THE CALL, AFTER CALL ENDED, INIT REG USING DIFFERENT P-CSCF | H-PLMN TIMER VALUE: 15S<br><br>V-PLMN TIMER VALUE: 25S<br><br>FIRE ACTION:<br>IF (180 IS RECEIVED) OR (BOTH 183 AND EARLY MEDIA IS RECEIVED) THEN {<br><br>USE DEFAULT EPS BEARER TO CONTINUE THE CALL, WHEN THE CALL IS ENDED, DISCONNECT E-PDN)<br><br>}<br><br>ELSE {<br><br>LTE-ONLY DIFF RAT |

TABLE 1-continued

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| | | | | }<br>ELSE {<br>CSFB. IF NO UNDERLINE CS NETWORK, LTE-ONLY DIFF RAT REATTEMPT PROCEDURES. AFTER CALL ENDS, THE NEXT CALL STARTS WITH A NEW E-PDN CONNECTION.<br>} | | REATTEMPT PROCEDURES. AFTER CALL ENDS, THE NEXT CALL STARTS WITH A NEW E-PDN CONNECTION.<br>} |
| F | SIP INVITE SENT | 200OK RESPONSE RECEIVED | TIMER VALUE: 25S<br>FIRE ACTION: CSFB, AFTER CS CALL ENDED, INIT REG USING DIFFERENT P-CSCF | H-PLMN TIMER VALUE: 15S<br>V-PLMN TIMER VALUE: 25S<br>FIRE ACTION: USE DEFAULT BEARER IF (180 IS RECEIVED) OR (200 IS RECEIVED) OR (183 AND EARLY MEDIA IS RECEIVED) THEN {<br>USE DEFAULT EPS BEARER TO CONTINUE THE CALL, WHEN THE CALL IS ENDED, DISCONNECT E-PDN)<br>}<br>ELSE {<br>CSFB. IF NO UNDERLINE CS NETWORK, LTE-ONLY DIFF RAT REATTEMPT PROCEDURES. AFTER CALL ENDS, THE NEXT CALL STARTS WITH A NEW E-PDN CONNECTION.<br>} | TIMER VALUE: 25S<br>FIRE ACTION: NO ACTION DURING THE CALL, AFTER CALL ENDED, INIT REG USING DIFFERENT P-CSCF | H-PLMN TIMER VALUE: 15S<br>V-PLMN TIMER VALUE: 25S<br>FIRE ACTION: IF (180 IS RECEIVED) OR (200 IS RECEIVED) OR (183 AND EARLY MEDIA IS RECEIVED) THEN {<br>USE DEFAULT EPS BEARER TO CONTINUE THE CALL, WHEN THE CALL IS ENDED, DISCONNECT E-PDN)<br>}<br>ELSE {<br>LTE-ONLY DIFF RAT REATTEMPT PROCEDURES. AFTER CALL ENDS, THE NEXT CALL STARTS WITH A NEW E-PDN CONNECTION.<br>} |
| G | E-PDN REQUEST SENT | ANY RESPONSE TO SIP INVITE RECEIVED | NA TO NORMAL CALL | FIRE ACTION: CSFB | NA TO NORMAL CALL | FIRE ACTION: REATTEMPT AFTER NEW DOMAIN P-LMN SELECTION |
| H | E-PDN REQUEST SENT | SIP FINAL RESPONSE (2XX + ERROR) RECEIVED | NA TO NORMAL CALL | FIRE ACTION: CSFB | NA TO NORMAL CALL | FIRE ACTION: REATTEMPT AFTER NEW DOMAIN P-LMN SELECTION |
| I | E-PDN REQUEST SENT | NON-100 TRYING RESPONSE RECEIVED | NA TO NORMAL CALL | DISABLE (TIMER NOT TRIGGERED) | NA TO NORMAL CALL | FIRE ACTION: REATTEMPT AFTER NEW DOMAIN P-LMN SELECTION |
| J | E-PDN REQUEST SENT | DEDICATED BEARER SETUP (REQUEST OR RESPONSE) | NA TO NORMAL CALL | DISABLE (NO VALUE ALLOW) | NA TO NORMAL CALL | DISABLE (NO VALUE ALLOW) |
| K | E-PDN REQUEST SENT | E-PDN RESPONSE RECEIVED | NA TO NORMAL CALL | TIMER VALUE: 5S | NA TO NORMAL CALL | TIMER VALUE: 5S |
| L | SIP INVITE SENT | ANY RESPONSE TO SIP INVITE RECEIVED | TIMER VALUE: 8S<br>FIRE ACTION: | TIMER VALUE: 8S<br>FIRE ACTION: CSFB. IF NO UNDERLYING CS | TIMER VALUE: 8S<br>FIRE ACTION: | TIMER VALUE: 8S<br>FIRE ACTION: LTE-ONLY, DIFF RAT REATTEMPT |

TABLE 1-continued

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| | | | CSFB | NETWORK, LTE-ONLY DIFF RAT REATTEMPT PROCEDURES.<br><br>AFTER CALL IS ENDED, THE NEXT CALL STARTS WITH A NEW E-PDN CONNECTION. | NO ACTION DURING THE CALL, WHEN THE CALL IS ENDED, INIT REG USING DIFFERENT P-CSCF( REMOVE THE P-CSCF ADDRESS FROM THE LIST OF P-CSCF ADDRESSES DISCOVERED DURING THE PROCEDURES DESCRIBED IN 3GPP 24.229 SUBCLAUSE 9.2.1; AND INITIATE AN INITIAL REGISTRATION AS SPECIFIED IN 3GPP 24.229 SUBCLAUSE 5.1.1.2 USING A P-CSCF DIFFERENT THAN THE P-CSCF USING WHICH THE CONTACT ADDRESS WAS REGISTERED;) WHEN THE AVAILABLE LIST HAS ZERO P-CSCF ADDRESS, PERFORM P-CSCF DISCOVERY PROCEDURES | PROCEDURES.<br><br>AFTER CALL IS ENDED, THE NEXT CALL STARTS WITH A NEW E-PDN CONNECTION. |
| M | SIP INVITE SENT | SIP FINAL RESPONSE (2XX + ERROR) RECEIVED | FIRE ACTION: CSFB | DISABLE (TIMER NOT TRIGGERED) | DISABLE (TIMER NOT TRIGGERED) | DISABLE (TIMER NOT TRIGGERED) |
| O | SIP INVITE SENT | NON-100 TRYING RESPONSE RECEIVED | FIRE ACTION: CSFB | FIRE ACTION: CSFB | DISABLE (TIMER NOT TRIGGERED) | DISABLE (TIMER NOT TRIGGERED) |
| P | 183 RESPONSE RECEIVED WITH SDP ANSWER (INFO) | DEDICATED BEARER ESTABLISHED (REQUEST OR RESPONSE) | TIMER VALUE: 8S<br><br>FIRE ACTION: CSFB PROCEDURES (AFTER CS CALL ENDED, A NEW IMS PDN CONN OBTAINS DIFFERENT P-CSCFS) | FIRE ACTION: CSFB | TIMER VALUE: 8S<br><br>FIRE ACTION: NO ACTION DURING THE CALL, AFTER CALL ENDED, TRIGGER INIT REG USING DIFFERENT P-CSCF | DISABLE (TIMER NOT TRIGGERED) |
| Q | SIP INVITE SENT | DEDICATED BEARER ESTABLISHED (REQUEST OR RESPONSE) | H-PLMN TIMER VALUE: 15S V-PLMN TIMER VALUE: 25S<br><br>FIRE ACTION: | FIRE ACTION: CSFB | H-PLMN TIMER VALUE: 15S V-PLMN TIMER VALUE: 25S<br><br>FIRE ACTION: NO ACTION | DISABLE (NO VALUE ALLOW) |

TABLE 1-continued

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| | | | IF THE P-CSCF LIST HAS THE LAST OR ONLY P-CSCF ADDRESS, THEN {<br>PERFORM CSFB PROCEDURES;<br>} ELSE {<br>DO NOTHING; WHEN THE CALL IS ENDED, CSFB;<br>} | | DURING THE CALL WHEN THE CALL IS ENDED, DISABLE WHEN THE LIST HAS THE LAST OR ONLY P-CSCF ADDRESS, PERFORM P-CSCF DISCOVERY PROCEDURES | |
| R | 2000K RESPONSE RECEIVED | DEDICATED BEARER ESTABLISHED (REQUEST OR RESPONSE) | IF (DEDICATED BEARER ESTABLISHED) AND (TIMER NOT FIRE), THEN<br>MO SENDS ACK<br>FIRE ACTION:<br>IF (DEDICATED BEARER NOT ESTABLISHED) AND (TIMER FIRES), THEN MO SENDS CANCEL (CAUSE=503; REASON = DEDICATED BEARER NOT ESTABLISHED) | IF (DEDICATED BEARER ESTABLISHED) AND (TIMER NOT FIRE), THEN<br>MO SENDS ACK<br>FIRE ACTION:<br>IF (DEDICATED BEARER NOT ESTABLISHED) AND (TIMER FIRES), THEN MO SENDS CANCEL (CAUSE=503; REASON = DEDICATED BEARER NOT ESTABLISHED) | IF (DEDICATED BEARER ESTABLISHED) AND (TIMER NOT FIRE), THEN MO SENDS ACK<br>FIRE ACTION:<br>IF (DEDICATED BEARER NOT ESTABLISHED) AND (TIMER FIRES), THEN MO SENDS CANCEL (CAUSE=503; REASON = DEDICATED BEARER NOT ESTABLISHED) | IF (DEDICATED BEARER ESTABLISHED) AND (TIMER NOT FIRE), THEN MO SENDS ACK<br>FIRE ACTION:<br>IF (DEDICATED BEARER NOT ESTABLISHED) AND (TIMER FIRES), THEN MO SENDS CANCEL (CAUSE=503; REASON = DEDICATED BEARER NOT ESTABLISHED) |
| S | SDP ANSWER (INFO) IN ANY SIP MESSAGE FROM MT<br>THREE USE CASES:<br>1. 183 + SDP ANSWER<br>2. 180 + SDP ANSWER<br>3. UPDATE + SDP ANSWER | DEDICATED BEARER ESTABLISHED (REQUEST OR RESPONSE) | TIMER VALUE: 8S<br>FIRE ACTION:<br>(CSFB IF NO 200 ANSWER,<br>NO ACTION IF 200 ANSWER RECEIVED) | TIMER VALUE: 8S<br>FIRE ACTION:<br>(CSFB IF NO 200 ANSWER,<br>NO ACTION IF 200 ANSWER RECEIVED) | DISABLE (TIMER NOT TRIGGERED) | DISABLE (TIMER NOT TRIGGERED) |
| T | 18X OR 200 RESPONSE RECEIVED WITH SDP ANSWER (INFO)<br>THREE USE CASES:<br>1. 183 + SDP ANSWER<br>2. 180 + SDP ANSWER<br>3. 200 + SDP ANSWER<br>TWO FALSE CASES: | DEDICATED BEARER ESTABLISHED (REQUEST OR RESPONSE) | IF (TIMER NOT FIRE) AND (DEDICATED BEARER ESTABLISHED), THEN<br>TIMER FIRED, CONTINUE THE CALL;<br>MO SENDS ACK WHEN 200 ANSWER IS RECEIVED;<br>MO KEEPS CURRENT CALL STATE (DIALING OR RINGING), ACK IS NOT | FIRE ACTION:<br>IF (TIMER NOT FIRE) AND (DEDICATED BEARER ESTABLISHED), THEN<br>TIMER FIRED, CONTINUE THE CALL;<br>MO SENDS ACK WHEN 200 ANSWER IS RECEIVED;<br>MO KEEPS CURRENT CALL STATE (DIALING OR RINGING), ACK IS NOT SENT;<br>END-IF<br>IF (DEDICATED BEARER NOT ESTABLISHED) AND | FIRE ACTION:<br>IF (TIMER NOT FIRE) AND (DEDICATED BEARER ESTABLISHED), THEN<br>TIMER FIRED, CONTINUE THE CALL;<br>MO SENDS ACK WHEN 200 ANSWER IS RECEIVED;<br>MO KEEPS CURRENT CALL STATE | FIRE ACTION:<br>IF (TIMER NOT FIRE) AND (DEDICATED BEARER ESTABLISHED), THEN<br>TIMER FIRED, CONTINUE THE CALL;<br>MO SENDS ACK WHEN 200 ANSWER IS RECEIVED;<br>MO KEEPS CURRENT CALL STATE (DIALING OR RINGING), ACK IS NOT SENT;<br>END-IF<br>IF (DEDICATED BEARER NOT ESTABLISHED) AND (TIMER FIRES), THEN<br>MO SENDS CANCEL |

TABLE 1-continued

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| | 1. 183 + NO SDP 2. 180 + NO SDP | | SENT; END-1F<br><br>FIRE ACTION: IF (DEDICATED BEARER NOT ESTABLISHED) AND (TIMER FIRES), THEN MO SENDS CANCEL (CAUSE=503; REASON = DEDICATED BEARER NOT ESTABLISHED)<br><br>CSFB. | (TIMER FIRES), THEN MO SENDS CANCEL (CAUSE=503; REASON = DEDICATED BEARER NOT ESTABLISHED)<br><br>CSFB. | (DIALING OR RINGING), ACK IS NOT SENT; END-IF<br><br>IF (DEDICATED BEARER NOT ESTABLISHED) AND (TIMER FIRES), THEN MO SENDS CANCEL (CAUSE=503; REASON = DEDICATED BEARER NOT ESTABLISHED)<br><br>TERMINATE THE CALL. | (CAUSE=503; REASON = DEDICATED BEARER NOT ESTABLISHED)<br><br>REATTEMPT USING A DIFFERENT P-CSCF. |
| U | SIP INVITE SENT | DEDICATED BEARER ESTABLISHED (REQUEST OR RESPONSE) OR 183 + EARLY MEDIA RECEIVED OR 180 RESPONSE RECEIVED OR FINAL SIP RESPONSE (2XX + ERROR) RECEIVED | FIRE ACTION: CSFB | FIRE ACTION: CSFB | DISABLE (TIMER NOT TRIGGERED) | FIRE ACTION: REATTEMPT AFTER NEW DOMAIN P-LMN SELECTION |
| V | SIP 180 RESPONSE RECEIVED | FINAL SIP RESPONSE (2XX + ERROR) RECEIVED | FIRE ACTION: DROP | FIRE ACTION: DROP | FIRE ACTION: DROP | FIRE ACTION: DROP |
| W | SIP INVITE SENT | SIP 180 RESPONSE RECEIVED | FIRE ACTION: CSFB | FIRE ACTION: CSFB | DISABLE (TIMER NOT TRIGGERED) | FIRE ACTION: REATTEMPT AFTER NEW DOMAIN P-LMN SELECTION |
| X | SIP 100 RESPONSE RECEIVED OR SIP 183 RESPONSE RECEIVED | 183 + EARLY MEDIA RECEIVED OR 180 RESPONSE RECEIVED OR 200 RESPONSE RECEIVED | TIMER VALUE: 25S<br><br>FIRE ACTION: CSFB | TIMER VALUE: 25S<br><br>FIRE ACTION: CSFB PROCEDURES. IF NO UNDERLINE CS NETWORK, LTE-ONLY DIFF RAT REATTEMPT PROCEDURES. | TIMER VALUE: 25S<br><br>FIRE ACTION: NO ACTION DURING THE CALL WHEN THE CALL IS ENDED, DISABLE WHEN THE AVAILABLE LIST HAS ZERO P-CSCF ADDRESS, PERFORM P-CSCF DISCOVERY PROCEDURES | TIMER VALUE: 25S<br><br>FIRE ACTION: LTE-ONLY DIFF RAT REATTEMPT PROCEDURES. |
| Y | 183 RESPONSE RECEIVED WITH SDP ANSWER (INFO) | DEDICATED BEARER ESTABLISHED (REQUEST OR RESPONSE)<br><br>OR<br><br>183 + EARLY | TIMER VALUE: 8S<br><br>FIRE ACTION: CSFB | TIMER VALUE: 8S<br><br>FIRE ACTION: CSFB. IF NO UNDERLINE CS NETWORK, LTE-ONLY DIFF RAT REATTEMPT PROCEDURES | TIMER VALUE: 8S<br><br>FIRE ACTION: NO ACTION DURING THE CALL * WHEN THE CALL IS | TIMER VALUE: 8S<br><br>FIRE ACTION: CSFB PROCEDURES. IF NO UNDERLINE CS NETWORK, LTE-ONLY DIFF RAT REATTEMPT PROCEDURES |

TABLE 1-continued

Example Session Setup Timers

| TIMER | TRIGGER EVENT | TERMINATION EVENT | ATTACH RESULT IE = EPS/IMSI NORMAL | ATTACH RESULT IE = EPS/IMSI EMERGENCY | ATTACH RESULT IE = EPS ONLY NORMAL | ATTACH RESULT IE = EPS ONLY EMERGENCY |
|---|---|---|---|---|---|---|
| | | MEDIA RECEIVED OR 180 RECEIVED OR 200 RECEIVED | | | ENDED, DISABLE * WHEN THE AVAILABLE LIST HAS ZERO P-CSCF ADDRESS, PERFORM P-CSCF DISCOVERY PROCEDURES | |
| Z | E-REG REQUEST SENT | ANY RESPONSE TO E-REG REQUEST RECEIVED | NA TO NORMAL CALL | TIMER VALUE: 5S FIRE ACTION: ABORT E-REG; IF P-CSCF POOL HAS MORE THAN 1 P-CSCF ADDR, CONTINUE WITH ANONYMOUS INVITE ON ANOTHER P-CSCF IN THE P-CSCF LIST; OTHERWISE CONTINUE WITH ANONYMOUS INVITE ON THE SAME P-CSCF. | NA TO NORMAL CALL | TIMER VALUE: 5S FIRE ACTION: ABORT E-REG; IF P-CSCF POOL HAS MORE THAN 1 P-CSCF ADDR, CONTINUE WITH ANONYMOUS INVITE ON ANOTHER P-CSCF IN THE P-CSCF LIST; OTHERWISE CONTINUE WITH ANONYMOUS INVITE ON THE SAME P-CSCF. |

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
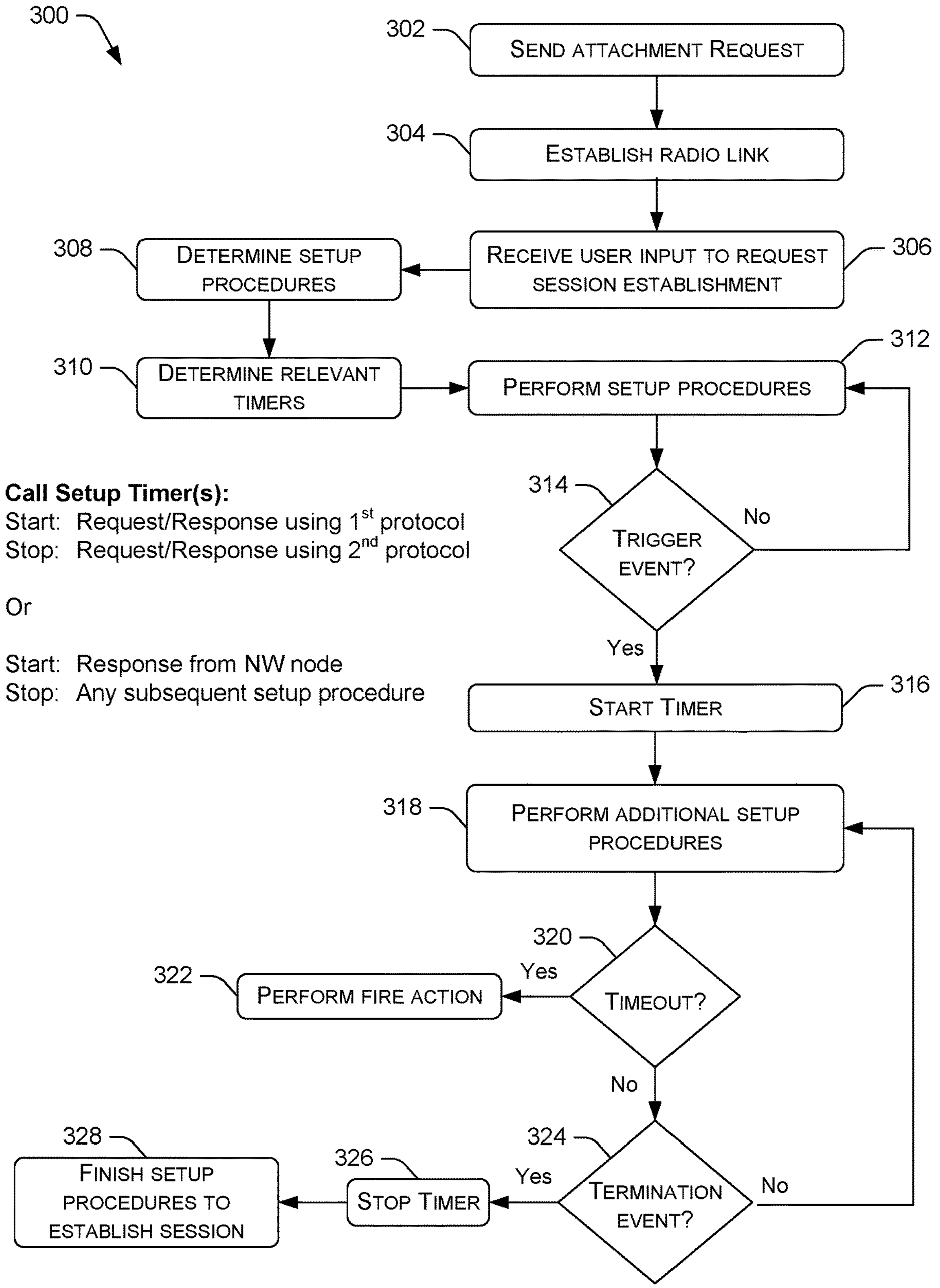
FIG. 3 illustrates a flowchart of an example process of utilizing one or more timers during setup of a communications session, according to various embodiments.

FIG. 3 illustrates a flowchart of an example process 300 of utilizing one or more timers 112/212 during setup of a communications session, according to various embodiments. The process 300 is described with reference to the previous figures.

At 302, an originating UE 100/200 can send an attachment request to establish a radio link with a RAN that is within communication range of the UE 100/200. For example, the originating UE 100/200 can attach to an eNodeB within communication range of the UE 100/200, the eNodeB forming part of a RAN that provides LTE coverage for establishing a communication session over an LTE network.

At 304, the originating UE 100/200 establishes a radio link with the RAN. As described herein, the attachment result at block 304 can vary depending on the circumstances. For example, if, in addition to LTE coverage, the originating UE 100/200 is at a geographic location that is within a coverage area of a legacy network, the radio link established at block 304 as a result of the attachment request at block 302 may be a result where the originating UE 100/200 is combined attached, and is able to utilize the legacy (e.g., CS) network as a fallback measure (e.g., CSFB). In different circumstances, such as when the UE 100/200 is at a geographic location in an LTE-only coverage area, the attach result at block 304 may be a result where the UE 100/200 is not combined attached (e.g., an EPS-only attach result). Blocks 302 and 304, in combination, may represent the attach procedure 106/206 referenced in the discussion of FIGS. 1A, 1B, 2A, and 2B, herein.

At 306, after the originating UE 100/200 is successfully attached and registration for IMS services is completed, the originating UE 100/200 may receive user input requesting to establish a communication session. The manner in which a user initiates a communication session (e.g., a call) can vary according to the examples provided herein. In the context of a call, the user may provide input to a touchscreen of the UE 100/200, for example, to dial a phone number or select a contact associated with a stored phone number.

At 308, the UE 100/200 may determine a set of setup procedures that are to be performed in order to setup the requested communication session. As noted above, the setup procedures may vary by the type of communication session (e.g., emergency verses non-emergency) initiated at block 306, and/or by the attachment result (e.g., combined attached verses not combined attached) at block 304. Accordingly, the determining at block 308 may include determining the type of communication session requested at block 306 and/or determining a result of the attachment request at block 304, and, based on the type of communication session and/or the attachment result, determining (e.g., looking up) the setup procedures to perform in order to setup the type of communication session requested.

At 310, the originating UE 100/200 may determine the relevant session setup timers 112/212 to be implemented based at least in part on the setup procedures determined at block 308. For example, given a set of setup procedures, the originating UE 100/200 can scan a table listing all available session setup timers for trigger events and termination events that match the setup procedures determined at block 308. This may be useful, for example, when an available timer 112/212 is triggered and terminated by setup procedures that are unique to an emergency call (e.g., a 911 call), and the user dials a non-emergency number at block 306. In this example scenario, the UE 100/200 determines that the available timer 112/212 that is triggered by emergency-related setup procedures is not implicated by the setup procedures determined for the non-emergency call, and thus, the timer 112/212 is excluded from a set of one or more relevant timers at block 310. In other words, the UE 100/200 can determine a subset of available timers that can possibly be triggered and terminated by the setup procedures determined at block 308. This sub-process of excluding irrelevant timers from consideration/implementation during session setup can conserve processing resources, as fewer timers are monitored for trigger events during session setup. Alternatively, the UE 100/200 may implement all available timers by omitting block 310 from the process 300.

At 312, the originating UE 100/200 may begin performing the multiple setup procedures that were determined at block 308 in order to setup the communication session. Again, because the particular setup procedures may vary by type of communication session and/or by the attachment result, the first few setup procedures can vary.

At 314, any implemented session setup timers 112/212 are monitored for the occurrence of a designated trigger event that starts the timer 112/212. Multiple different timers 112/212 can be monitored in parallel. As such, block 314 represents the monitoring of a trigger event, which may represent a trigger event that is designated for a particular session setup timer 112/212, or perhaps a common trigger event for multiple session setup timers that have different termination events. In some embodiments (as shown in FIG. 3 in the corresponding text adjacent to block 314), the trigger event (e.g., setup procedure) monitored at block 314 can comprise at least of: (i) sending a first request using a first signaling protocol or (ii) receiving a first response using the first signaling protocol. An example of this embodiment is described herein with reference to FIGS. 1A and 1B; namely, the trigger event can comprise sending a SIP request 110(1) using the SIP INVITE method from the UE 100 to the IMS core 102. In other embodiments, the trigger event (e.g., setup procedure) monitored at block 314 can comprise receiving a response from a node of a telecommunications network. An example of this embodiment is described herein with reference to FIGS. 2A and 2B; namely, the trigger event can comprise receiving a SIP 183 response that includes SDP information from the IMS core 202.

So long as the trigger event does not occur during performance of the setup procedures at block 312, the process 300 follows the "no" route from block 314 to block 312, by continuing to perform the setup procedures 312 with the aim of setting up the communication session. Once the trigger event occurs at block 314, however, the process 300 follows the "yes" route from block 314 to block 316 where a timer(s) 112/212 associated with the trigger event can be started in response to performance of the trigger event. The timer(s) 112/212 can be a local hardware or software timer (s) that is started by the originating UE 100/200 at block 316, and the timer 112/212 is configured to expire after a period of time since starting the timer at block 316. The period of time can be defined by a timer value, as described herein.

At 318, the originating UE 100/200 may continue performing the multiple setup procedures that were determined at block 308 in order to setup the communication session. The additional setup procedures include a subset of the multiple setup procedures that have not already been performed at block 312 leading up to the occurrence of the trigger event at block 314.

At 320, the session setup timer(s) 112/212 that was started at block 318 is monitored for timeout prior to the occurrence of a designated termination event that stops the timer(s) 112/212. The example process 300 will be described with respect to a single timer, but if multiple different timers 112/212 were started at block 316 by the occurrence of a common trigger event, those multiple timers 112/212 can be monitored in parallel for respective timeouts. In the multiple timer scenario, each timer 112/212 can have a different timer value, or multiple timers 112/212 can have the same timer value. In addition, if other session setup timers 112/212 are triggered by different trigger events, the process 300 can branch off for each triggered timer, in which case, the remainder of the process after starting each timer is similar to that described herein for a single timer.

If, at block 320, the time period for the triggered timer expires before the occurrence of the designated termination event, the process 300 follows the "yes" route from block 320 to block 322, where the originating UE 100/200 performs a fire action, as described herein. As an example, the fire action at block 322 may comprise halting the multiple setup procedures, and reattempting the setup of the communication session with new setup procedures 128/228. The new setup procedures 128/228 can be the same or different as the previously performed setup procedures. In some embodiments, reattempting the setup of the communication session with the new setup procedures 128/228 can comprise using at least one of a legacy telecommunications network (e.g., a CS network) where the originating UE 100/200 had previously attempted to establish the communication session over an LTE network. As another example, a reattempt at block 322 may use a different type of RAN, or a different type of RAT, as compared to the type of RAN or RAT that was previously used by the originating UE. This can include switching from VoLTE calling via a 3GPP RAN (e.g., an eNodeB) to VoWiFi calling via a non-3GPP (e.g., WiFi) RAN, using a wireless AP within communication range of the originating UE 100/200. As yet another example, a reattempt at block 322 may use a different address of a P-CSCF node as compared to the address of a previously used P-CSCF node during the previous attempt. Other fire actions that can be performed at block 322 may be listed in Table 1, herein.

If, at block 320, the timer 112/212 has not yet timed out/expired/fired, the process 300 follows the "no" route from block 320 to block 324, where the originating UE 100/200 monitors for the occurrence of a termination event that is designated for the timer 112/212. In some embodiments (as shown in FIG. 3 in the corresponding text adjacent to block 314), the termination event (e.g., setup procedure) monitored at block 324 can comprise at least of: (i) sending a second request using a second signaling protocol or (ii) receiving a second response using the second signaling protocol, where the second signaling protocol is different from the first signaling protocol used in the setup procedure that triggered the start of the timer 112/212 at block 314. An example of this embodiment is described herein with reference to FIGS. 1A and 1B; namely, the termination event can comprise sending a request 116(1) to the MME 104 using the NAS protocol (which is different than SIP) indicating that the dedicated bearer has been established. In other embodiments, where the trigger event comprises receiving a response from a node of a telecommunications network, the termination event (e.g., setup procedure) monitored at block 324 can comprise any suitable setup procedures that is to occur subsequently to the setup procedure that triggered the start of the timer 112/212. An example of this embodiment is described herein with reference to FIGS. 2A and 2B; namely, the termination event can comprise receiving a response from the MIME 204 that is requesting setup of the dedicated bearer.

So long as the termination event does not occur during performance of the additional setup procedures at block 318, the process 300 follows the "no" route from block 324 to block 318, by continuing to perform the additional setup procedures at block 318 with the aim of setting up the communication session, and iterating over blocks 320 and 324 to monitor both the timeout of the timer 112/212 and the occurrence of the termination event. If the termination event occurs at block 324 prior to expiration of the timer 112/212, the process 300 follows the "yes" route from block 324 to block 326 where a timer(s) 112/212 associated with the termination event can be stopped in response to performance of the termination event.

At block 328, after the timer 112/212 is stopped, the originating UE 100/200 can establish the communication session over a telecommunications network. The successful establishment of the communication session at block 328 assumes that, in a situation where multiple session setup timers are implemented, none of the other timers 112/212 that were triggered during the session setup fired/expired/timed out.

Thus, the process 300 illustrates a flexible approach to using one or more session setup timers during setup of a communication session to determine if and when a fire action is to be performed at 322 during session setup. As described elsewhere herein, this may, in turn, alleviate downstream network issues, such as network outages, due to an intelligent implementation of session setup timers.

Figure 4:
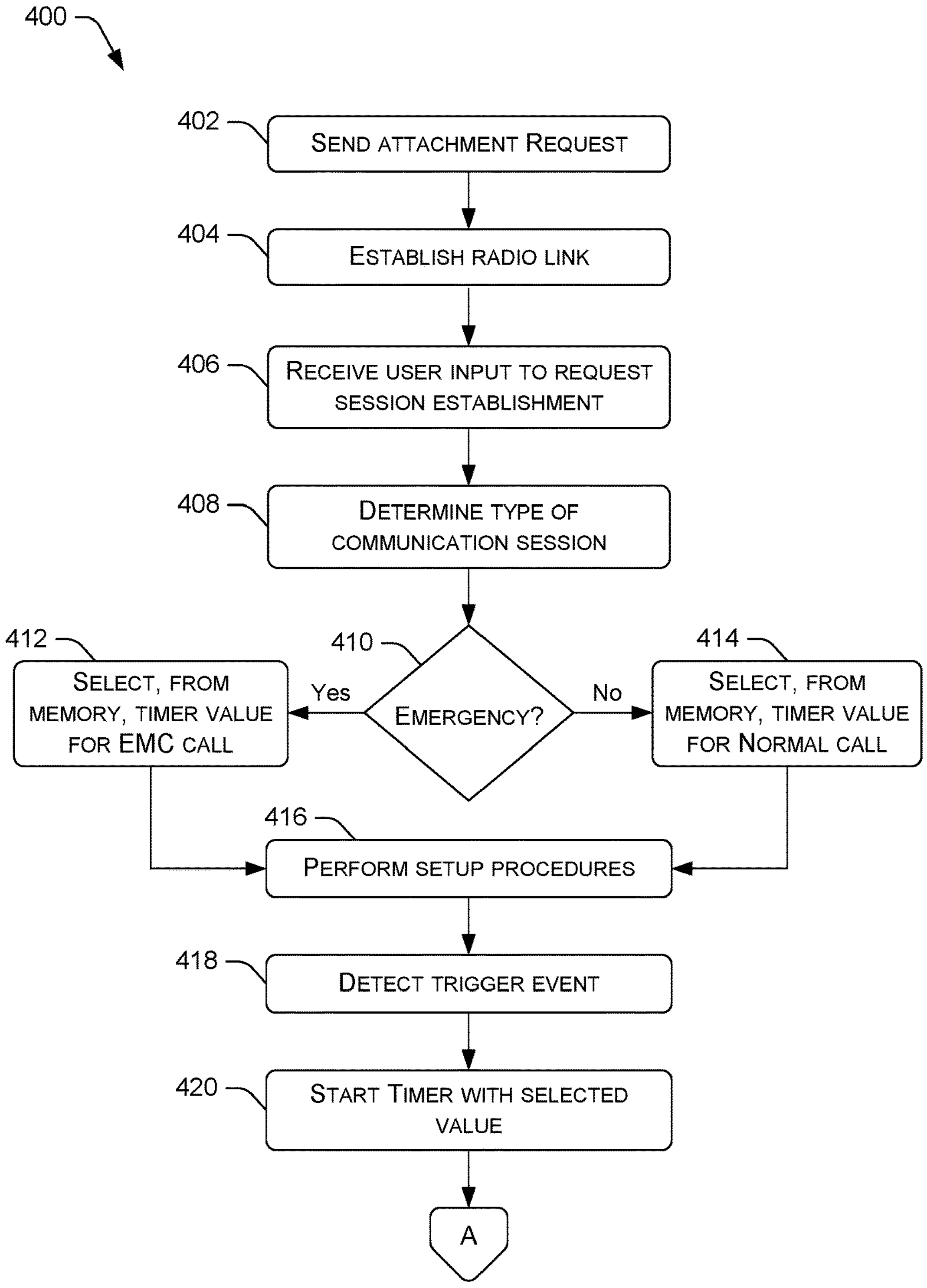
FIG. 4 illustrates a flowchart of an example process for selecting a timer value of a session setup timer based at least in part on a type of communication session.

FIG. 4 illustrates a flowchart of an example process 400 for selecting a timer value of a session setup timer 112/212 based at least in part on a type of communication session. The process 400 is described with reference to the previous figures and may represent a more detailed, sub-process of the process 300 described in FIG. 3.

At 402, an originating UE 100/200 can send an attachment request to establish a radio link with a RAN that is within communication range of the UE 100/200. Sending the attachment request at block 402 may be similar to the description of block 302 of FIG. 3.

At 404, the originating UE 100/200 establishes a radio link with the RAN. Establishing the radio link at block 404 may be similar to the description of block 304 of FIG. 3.

At 406, after the originating UE 100/200 is successfully attached and registration for IMS services is completed, the originating UE 100/200 may receive user input requesting to establish a communication session. Receiving the user input at block 406 may be similar to the description of block 306 of FIG. 3.

At 408, a type of communication session may be determined based on the user input received at 406. For example, if the user dialed 911 at block 406, the type of communication session may be determined as an emergency call. On the other hand, if the user dialed a 10 digit phone number of a friend at block 406, the type of communication session may be determined as a non-emergency call (or a normal call).

Accordingly, at 410, the originating UE 100/200 may determine whether the type of communication session is an emergency communication session. If so, the process 400 follows the "yes" route from block 410 to block 412, where the UE 100/200 may select, from among a plurality of timer values stored in memory (e.g., memory of the UE 100/200 or a remote memory resource), a timer value for a session setup timer 112/212 that corresponds to the emergency type of communication session (e.g., a 911 call). If, on the other hand, it is determined at 410 that the type of communication session is a non-emergency communication session (e.g., a normal call), the process 400 follows the "no" route from block 410 to block 414, where the UE 100/200 may select, from among the plurality of timer values stored in memory, a different timer value for a session setup timer 112/212 that corresponds to the non-emergency type of communication session (e.g., a call to a friend using a 10 digit phone number).

At 416, the originating UE 100/200 may begin performing setup procedures in order to setup the communication session. Again, because the particular setup procedures may vary by type of communication session and/or by the attachment result, the setup procedures can vary. In some embodiments, the setup procedures performed at 416 may include those setup procedures determined at block 308 of the process 300 in FIG. 3.

At 418, for any implemented session setup timers 112/212 being monitored during session setup, the UE 100/200 may detect the occurrence of a trigger event. As described herein, the trigger event (e.g., setup procedure) detected at block 418 can comprise at least of: (i) sending a first request using a first signaling protocol or (ii) receiving a first response using the first signaling protocol. An example of this embodiment is described herein with reference to FIGS. 1A and 1B; namely, the trigger event can comprise sending a SIP request 110(1) using the SIP INVITE method from the UE 100 to the IMS core 102. In other embodiments, the trigger event (e.g., setup procedure) detected at block 418 can comprise receiving a response from a node of a telecommunications network. An example of this embodiment is described herein with reference to FIGS. 2A and 2B; namely, the trigger event can comprise receiving a SIP 183 response that includes SDP information from the IMS core 202.

At 420, in response to detection of the trigger event at block 418, the timer 112/212 associated with the trigger event can be started using the selected value. Thus, depending on the type of communication session, the timer can be started with a particular value at block 420 that corresponds to the type of communication session. In the case of an emergency call, for example, the timer 112/212 can be started with a timer value of 5 seconds, whereas, for a non-emergency call, the same timer 112/212 can be started with a timer value of 8 seconds. This allows for dynamic selection of an appropriate timer value depending on the type of communication session.

Figure 5:
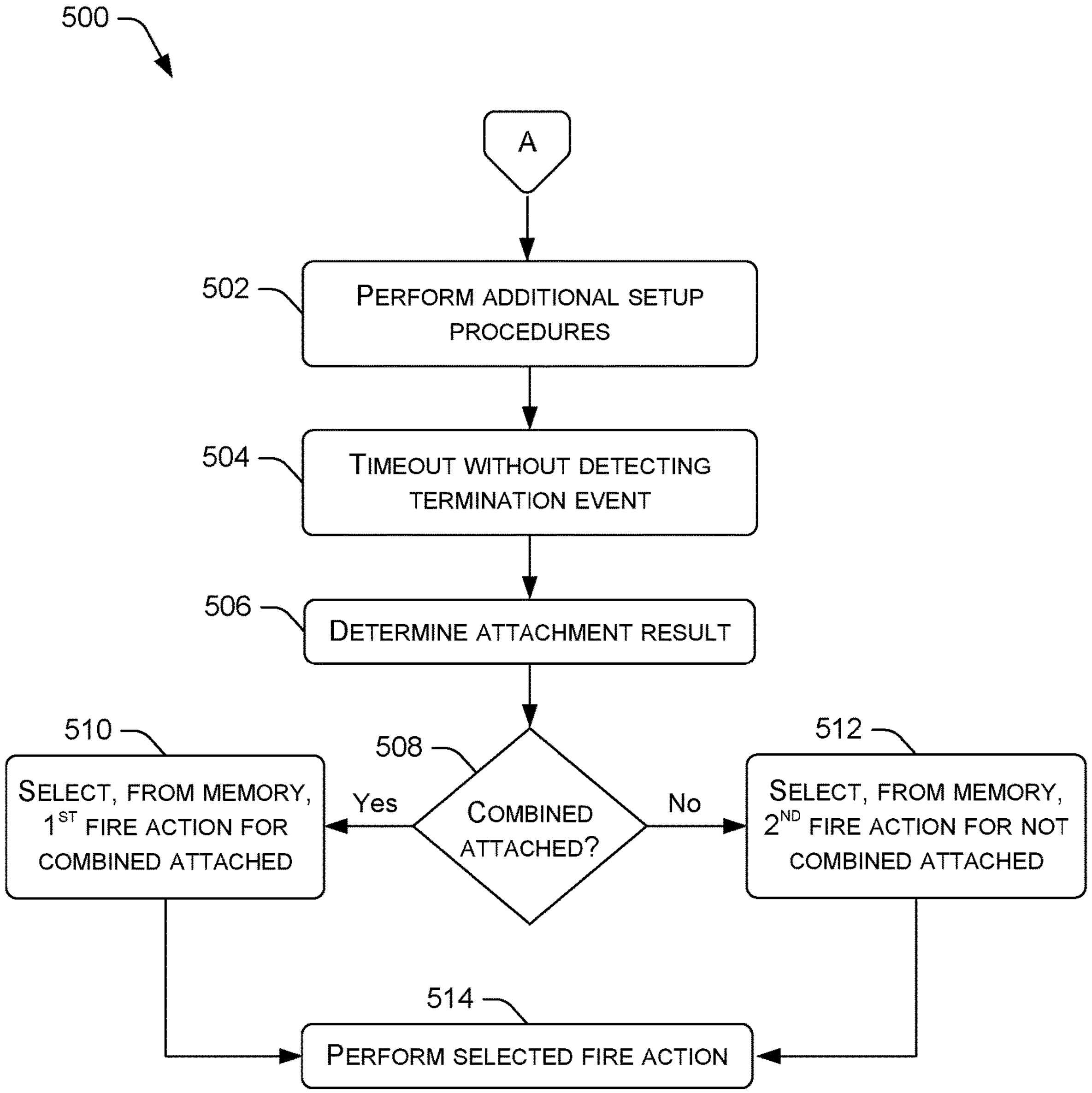
FIG. 5 illustrates a flowchart of an example process for selecting a fire action to be performed at timeout of a session setup timer, the fire action selected based at least in part on a result of an attachment request.

FIG. 5 illustrates a flowchart of an example process 500 for selecting a fire action to be performed at timeout of a session setup timer 112/212, the fire action selected based at least in part on a result of an attachment request. The process 500 is described with reference to the previous figures and may represent a more detailed, sub-process of the process 300 described in FIG. 3. Furthermore, as shown by the off-page reference "A" in FIGS. 4 and 5, the process 500 may continue from block 420 of the process 400, after the session setup timer 112/212 has been started in response to the occurrence of a designated trigger event.

At 502, the originating UE 100/200—that started the timer at block 420 of the process 400—may continue performing setup procedures that have not already been performed leading up to the occurrence of the trigger event at block 418.

At 504, the triggered timer 112/212 times out/expires/fires before the occurrence of a designated termination event associated with the timer 112/212. Expiration of the timer at block 504 means that the originating UE 100/200 performs a fire action designated for the timer. However, the fire action may vary depending on the attachment result at block 404 of the process 400.

Accordingly, at 506, the originating UE 100/200 may determine a result of the UE's 100/200 attachment request, such as by determining whether the UE 100/200 is combined attached or not.

At 508, if it is determined that the originating UE 100/200 is combined attached, the process 500 follows the "yes" route from block 508 to block 510, where the UE 100/200 may select, from among a plurality of fire actions stored in memory (e.g., memory of the UE 100/200 or a remote memory resource), a fire action for the triggered session setup timer 112/212 that corresponds to a combined attached result of the attachment request. If, on the other hand, it is determined at 508 that the originating UE 100/200 is not combined attached (e.g., EPS-only attached), the process 500 follows the "no" route from block 508 to block 512, where the UE 100/200 may select, from among the plurality of fire actions stored in memory, a different fire action for the triggered session setup timer 112/212 that corresponds to a non-combined attached result.

At 514, the originating UE 100/200 performs the selected fire action. As an example, the UE 100/200 may select a fire action at block 510 (corresponding to the combined attached result) that includes reattempting the setup of the communication session using at least one of a legacy telecommunications network (e.g., a CS network). As another example, the UE 100/200 may select a fire action at block 512 (corresponding to the non-combined attached result) that includes reattempting the setup of the communication session using a different type of RAN, or a different type of RAT, as compared to the type of RAN or RAT that was previously used by the originating UE. Other fire actions that can be selected at block 510 or 512 and performed at block 514 may be listed in Table 1, herein.

Figure 6:
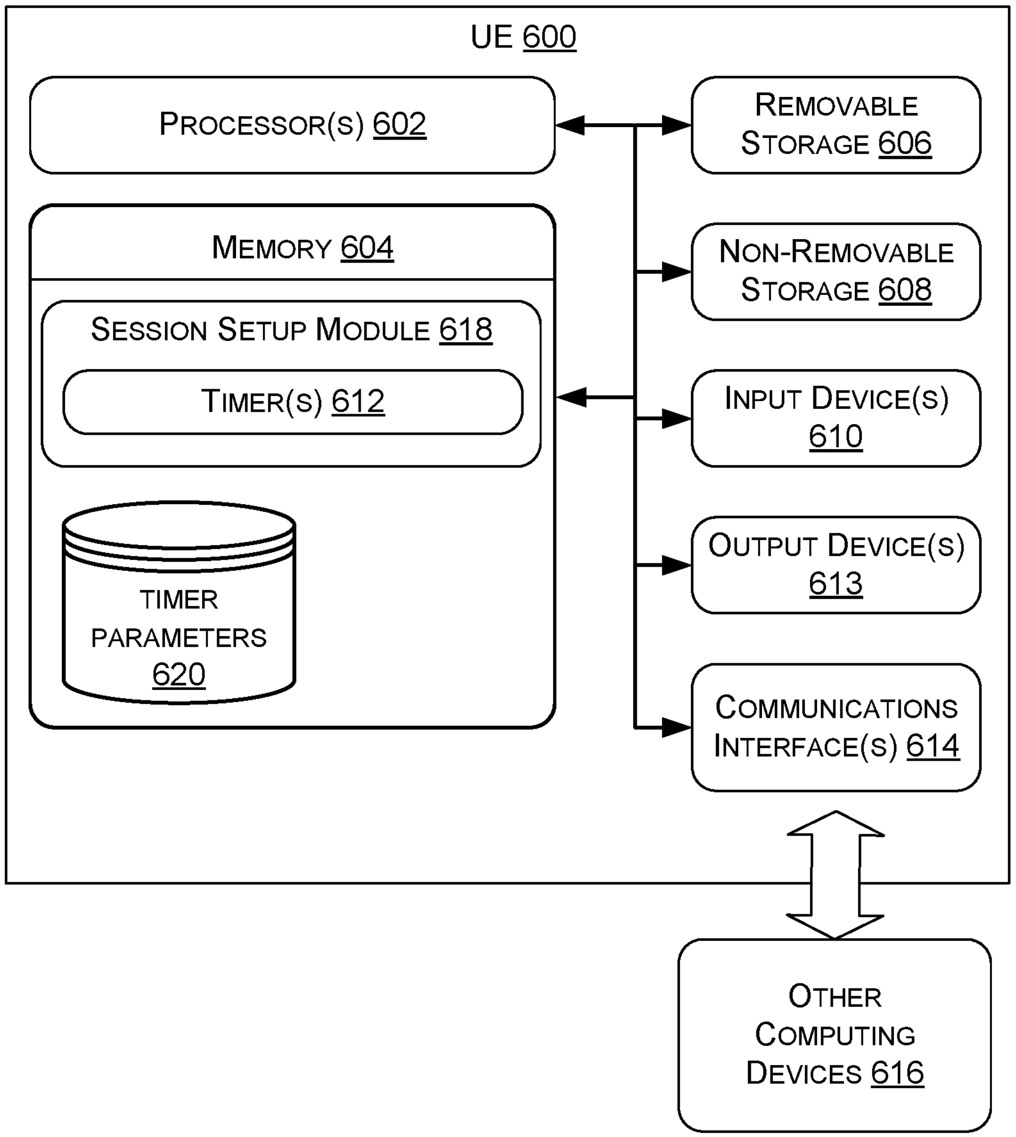
FIG. 6 is a block diagram of an example originating UE with logic to implement one or more session setup timers, according to various embodiments.

FIG. 6 is a block diagram of an example originating UE 600 with logic to implement one or more session setup timers 612, according to various embodiments. The UE 600 may be representative of the originating UE 100 of FIGS. 1A and 1B and/or the originating UE 200 of FIGS. 2A and 2B.

As shown, the UE 600 may include one or more processors 602 and one or more forms of computer-readable memory 604. The UE 600 may also include additional storage devices. Such additional storage may include removable storage 606 and/or non-removable storage 608.

The UE 600 may further include input devices 610 (e.g., a touch screen, keypad, keyboard, mouse, pointer, microphone, etc.) and output devices 613 (e.g., a display, printer, speaker, etc.) communicatively coupled to the processor(s) 602 and the computer-readable memory 604. The UE 600 may further include communications interface(s) 614 that allow the UE 600 to communicate with other computing devices 616 (e.g., IMS nodes) such as via a network (e.g., the IMS core 102/202, the MME 104/204, etc.). The communications interface(s) 614 may facilitate transmitting and receiving wired and/or wireless signals over any suitable communications/data technology, standard, or protocol, as described herein. For example, the communications interface(s) 614 can comprise one or more of a cellular radio, a wireless (e.g., IEEE 802.1x-based) interface, a Bluetooth® interface, and so on. In some embodiments, the communications interface(s) 614 may include radio frequency (RF) circuitry that allows the UE 600 to transition between different RATs, such as transitioning between communication with a 4G LTE RAT and a legacy RAT (e.g., 3G/2G). The communications interface(s) 614 may further enable the UE 600 to communicate over circuit-switch domains and/or packet-switch domains.

In various embodiments, the computer-readable memory 604 comprises non-transitory computer-readable memory 604 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 604 may also be described as computer storage media and may include volatile and nonvolatile, removable and non-removable media implemented in any method or technology for storage of information, such as computer readable instructions, data structures, program modules, or other data. Computer-readable memory 604, removable storage 606 and non-removable storage 608 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 600. Any such computer-readable storage media may be part of the UE 600.

The memory 604 can include a session setup module 618 (i.e., computer-executable instructions (or logic) that, when executed, by the processor(s) 602, perform the various acts and/or processes disclosed herein. For example, the session setup module 618 can be configured to carry out the setup procedures described herein that can include various actions and message transmissions for setting up and establishing a communication session (e.g., a VoLTE call).

As shown in FIG. 6, the session setup module 618 is further configured to implement one or more session setup timers 612, which may be similar to those session setup timers 112/212 described elsewhere herein.

The memory 604 can further be used to store timer parameters 620, such as trigger events, termination events, timer values, and/or fire actions associated with particular timers. Table 1 includes examples of timer parameters 620 that may be stored in memory of the originating UE 600. Although the timer parameters are illustrated as being stored locally on the UE 600, the UE 600 may be configured to access the timer parameters from a remote storage location, such as a Cloud-based service that maintains timer parameters and continually updates those parameters. For locally stored timer parameters, parameter updates may be pushed, periodically, to the UE 600 for storage in the memory 604.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A device comprising:
- a processor; and
- memory storing computer-executable instructions that, when executed by the processor, cause the device to:
  - receive input to establish a communication session;
  - setup the communication session, including:
    - communicating using a first signaling protocol, wherein the device communicating using the first signaling protocol is a trigger event for a timer;
    - starting the timer based on the occurrence of the trigger event, the timer being configured to expire after a period of time;
    - prior to expiration of the timer, communicating using a second signaling protocol that is different than the first signaling protocol, wherein the device communicating using the second signaling protocol is a termination event for the timer; and
    - stopping the timer based on the occurrence of the termination event; and
  - establish the communication session over a telecommunications network.

2. The device of claim 1, wherein the first signaling protocol comprises Session Initiation Protocol (SIP), and the second signaling protocol comprises Non-Access Stratum (NAS) protocol.

3. The device of claim 2, wherein:
- communicating using the first signaling protocol comprises sending a first request using a SIP INVITE method; and
- communicating using the second signaling protocol causes setup of a dedicated evolved packet system (EPS) bearer.

4. The device of claim 3, wherein communicating using the second signaling protocol initiates the setup of the dedicated EPS bearer.

5. The device of claim 3, wherein communicating using the second signaling protocol completes the setup of the dedicated EPS bearer.

6. The device of claim 1, wherein the memory stores a plurality of values that are selectable to define the period of time associated with the timer, the plurality of values including at least a first value associated with an emergency call, and a second value associated with a non-emergency call, the computer-executable instructions, when executed by the processor, further causing the device to:
- determine that the communication session is a type of communication session comprising at least one of the emergency call or the non-emergency call; and
- select the first value or the second value as a selected value for the period of time based at least in part on the type of communication session.

7. The device of claim 1, the computer-executable instructions, when executed by the processor, further causing the device to send an attachment request to establish a radio link with a radio access network (RAN) that is within communication range of the device, wherein the memory stores a plurality of actions to be taken by the device upon the expiration of the timer, the plurality of actions including a first action associated with a first result of the attachment request where the device is combined attached, and a second action associated with a second result of the attachment request where the device is not combined attached.

8. The device of claim 7, wherein the plurality of actions include at least one of reattempting the setup of the communication session using at least one of:
- a legacy telecommunications network;
- a different type of RAN than a type of the RAN with which the device previously established the radio link; or
- a different address of a proxy-call serving control function (P-CSCF) node than an address of a previous P-CSCF node to which the device previously sent requests.

9. A method comprising:
- receiving, by a device, input to establish a communication session;
- setting up, by the device, the communication session, including:
  - communicating using a first signaling protocol, wherein the device communicating using the first signaling protocol is a trigger event for a timer;
  - starting the timer based on the occurrence of the trigger event, the timer being configured to expire after a period of time;
  - prior to expiration of the timer, communicating using a second signaling protocol that is different than the first signaling protocol, wherein the device communicating using the second signaling protocol is a termination event for the timer; and
  - stopping the timer based on the occurrence of the termination event; and
- establishing, by the device, the communication session over a telecommunications network.

10. The method of claim 9, wherein the first signaling protocol comprises Session Initiation Protocol (SIP), and the second signaling protocol comprises Non-Access Stratum (NAS) protocol.

11. The method of claim 10, wherein:
- communicating using the first signaling protocol comprises sending a first request using a SIP INVITE method; and
- communicating using the second signaling protocol comprises sending a second request using the NAS protocol to setup a dedicated evolved packet system (EPS) bearer.

12. The method of claim 10, wherein:
- communicating using the first signaling protocol comprises receiving a first response using the SIP protocol; and communicating using the second signaling protocol comprises receiving a second response using the NAS protocol to setup a dedicated evolved packet system (EPS) bearer.

13. The method of claim 12, wherein the second response comprises a radio resource control (RRC) connection response from a mobility management entity (MME) to initiate the setup of the dedicated EPS bearer.

14. A method comprising:

receiving, by a device, input to establish a communication session;

setting up, by the device, the communication session, including:

communicating using a first signaling protocol, wherein the device communicating using the first signaling protocol is a trigger event for a timer;

starting the timer based on the occurrence of the trigger event, the timer being configured to expire after a period of time and to stop if a termination event for the timer occurs prior to expiration of the timer, wherein the device communicating using a second signaling protocol that is different than the first signaling protocol is the termination event for the timer; and determining that the timer has expired prior to an occurrence of the termination event;

halting the setting up of the communication session; and reattempting setup of the communication session with different setup procedures.

15. The method of claim 14, wherein the first signaling protocol comprises Session Initiation Protocol (SIP), and the second signaling protocol comprises Non-Access Stratum (NAS) protocol.

16. The method of claim 14, further comprising, prior to the receiving of the input to establish the communication session, sending, by the device, an attachment request to establish a radio link with a first radio access network (RAN) that is within communication range of the device, wherein the reattempting of the setup of the communication session comprises reattempting the setup by attaching to a different type of RAN than a type of the first RAN with which the device previously established the radio link.

17. The method of claim 14, further comprising, prior to the receiving of the input to establish the communication session, sending, by the device, an attachment request to establish a long term evolution (LTE) radio link to establish the communication session over an LTE telecommunications network, wherein the reattempting of the setup of the communication session comprises reattempting the setup by establishing a legacy network radio link to establish the communication session over a legacy telecommunications network.

18. The method of claim 14, further comprising, prior to the receiving of the input to establish the communication session, sending, by the device, an attachment request to establish a radio link to establish the communication session over a telecommunications network, wherein the device stores, in memory, a plurality of actions to be taken by the device upon the expiration of the timer, the plurality of actions to be used for the reattempting of the setup of the communication session and including a first action associated with a first result of the attachment request where the device is combined attached, and a second action associated with a second result of the attachment request where the device is not combined attached, the method further comprising:

determining that a result of the attachment request is the first result or the second result; and performing the first action or the second action based at least in part on the result of the attachment request in order to reattempt the setup of the communication session.

19. The method of claim 14, wherein the device stores, in memory, a plurality of values that are selectable to define the period of time associated with the timer, the plurality of values including at least a first value associated with an emergency call, and a second value associated with a non-emergency call, the method further comprising:

determining that the communication session is a type of communication session comprising at least one of the emergency call or the non-emergency call; and selecting the first value or the second value as a selected value for the period of time based at least in part on the type of communication session.

20. The method of claim 14, wherein:

communicating using the first signaling protocol comprises sending a first request using Session Initiation Protocol (SIP) to setup the communication session with a second device; and communicating using the second signaling protocol comprises sending a second request or receiving a second response using Non-Access Stratum (NAS) protocol to setup a dedicated evolved packet system (EPS) bearer.

* * * * *